United States Patent
Skelton

(10) Patent No.: US 11,544,654 B2
(45) Date of Patent: Jan. 3, 2023

(54) DYNAMIC USER MANAGEMENT PLATFORM

(71) Applicant: Symend Inc., Calgary (CA)

(72) Inventor: Dean Skelton, Calgary (CA)

(73) Assignee: Symend Inc., Calgary (CA)

( * ) Notice: Subject to any disclaimer, the term of this patent is extended or adjusted under 35 U.S.C. 154(b) by 66 days.

(21) Appl. No.: 17/100,655

(22) Filed: Nov. 20, 2020

(65) Prior Publication Data
US 2021/0174287 A1    Jun. 10, 2021

Related U.S. Application Data

(60) Provisional application No. 62/945,782, filed on Dec. 9, 2019.

(51) Int. Cl.
*G06Q 10/06* (2012.01)
*G06Q 10/10* (2012.01)
(Continued)

(52) U.S. Cl.
CPC ....... *G06Q 10/06375* (2013.01); *G06F 40/30* (2020.01); *G06N 5/04* (2013.01); *G06N 20/00* (2019.01); *G06Q 10/0639* (2013.01); *G06Q 10/107* (2013.01); *G06Q 30/016* (2013.01); *G06Q 30/018* (2013.01); *G06Q 30/0201* (2013.01); *G06Q 10/0637* (2013.01)

(58) Field of Classification Search
CPC ......... G06Q 10/06375; G06Q 10/0639; G06Q 10/107; G06Q 10/0637; G06Q 30/016; G06Q 30/018; G06Q 30/0201; G06N 20/00; G06N 5/04; G06F 40/30

USPC .......................................................... 705/304
See application file for complete search history.

(56) References Cited

U.S. PATENT DOCUMENTS 6,732,079 B1 * 5/2004 Kintner ................. G06Q 10/04
                                                                705/7.13
8,049,677 B2 * 11/2011 Lum .................. H04N 1/32561
                                                                358/1.15

(Continued)

OTHER PUBLICATIONS

Katabat Launches Machine Learning-Powered Debt Collections Software. PR Newswire [New York] Oct. 25, 2018.*
(Continued)

*Primary Examiner* — Timothy Padot
(74) *Attorney, Agent, or Firm* — John W. Branch; Branch Partners PLLC

(57) ABSTRACT

Embodiments are directed to managing user associations with service providers. A status value for an association between a user and a service provider may be provided if a user may be non-compliant with one or more terms of the association. Treatment plans for the user may be determined based on the classification of the user. Response information associated with the user may be generated based on execution of the treatment plans such that the user information may be updated based on the response information. During execution of the treatment plans at each evaluation point, result models may be employed to classify the response information or the updated user information. In response to non-compliance by the user with one or more conditions of a current treatment plan, other treatment plans may be determined and executed based on the updated user information.

24 Claims, 12 Drawing Sheets

(51) Int. Cl.
*G06Q 30/00* (2012.01)
*G06Q 30/02* (2012.01)
*G06F 40/30* (2020.01)
*G06N 5/04* (2006.01)
*G06N 20/00* (2019.01)

(56) References Cited

U.S. PATENT DOCUMENTS

| | | | | |
|---|---|---|---|---|
| 8,296,244 | B1* | 10/2012 | Heroux | G06Q 50/20 |
| | | | | 705/317 |
| 8,682,762 | B2* | 3/2014 | Fahner | G06Q 40/02 |
| | | | | 705/35 |
| 10,431,108 | B2* | 10/2019 | Chestnut | G09B 19/0076 |
| 2002/0120510 | A1* | 8/2002 | Kawakami | G06Q 30/0207 |
| | | | | 705/14.1 |
| 2004/0024769 | A1* | 2/2004 | Forman | G06K 9/6282 |
| 2007/0043608 | A1* | 2/2007 | May | G06Q 10/10 |
| | | | | 705/7.29 |
| 2007/0052586 | A1* | 3/2007 | Horstemeyer | G06Q 10/06311 |
| | | | | 342/457 |
| 2012/0232932 | A1* | 9/2012 | Voccola | G06Q 40/08 |
| | | | | 705/4 |
| 2014/0095236 | A1* | 4/2014 | Podgurny | G06Q 10/06311 |
| | | | | 705/7.14 |
| 2014/0195396 | A1* | 7/2014 | Bhakta | G06Q 40/02 |
| | | | | 705/35 |
| 2014/0244712 | A1* | 8/2014 | Walters | G06Q 10/10 |
| | | | | 709/202 |
| 2014/0330944 | A1* | 11/2014 | Dabbiere | H04L 63/102 |
| | | | | 709/220 |
| 2014/0358611 | A1* | 12/2014 | Datta | G06Q 10/103 |
| | | | | 705/7.15 |
| 2016/0092924 | A1* | 3/2016 | Brooks | H04W 4/029 |
| | | | | 705/14.58 |
| 2019/0378207 | A1* | 12/2019 | Dibner-Dunlap | H04L 67/535 |

OTHER PUBLICATIONS

Deltec Bank, Bahamas says Artificial Intelligence Will Change KYC, AML and Compliance Process. M2 Presswire Dec. 31, 2019.*

* cited by examiner

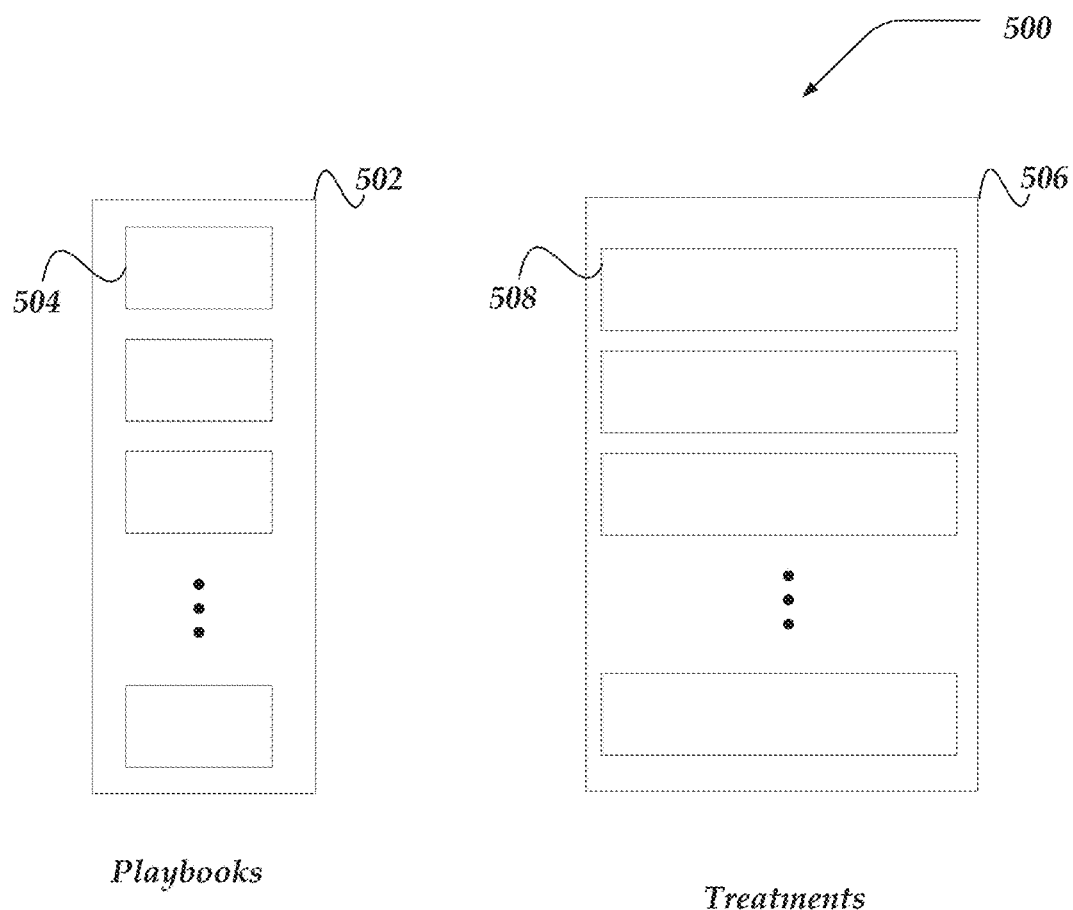
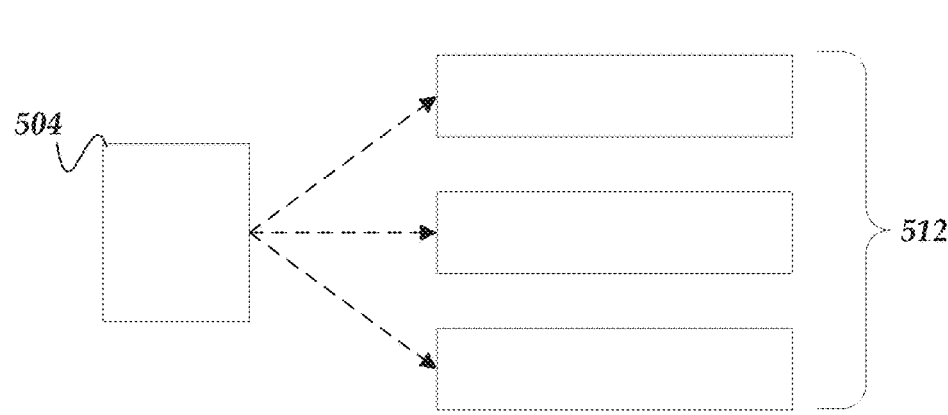
*Fig. 5*

DYNAMIC USER MANAGEMENT PLATFORM

CROSS-REFERENCE TO RELATED APPLICATION

This application is a Utility Patent application based on previously filed U.S. Provisional Patent Application No. 62/945,782 filed on Dec. 9, 2019, the benefit of the filing date of which is hereby claimed under 35 U.S.C. § 119(e) and which is further incorporated in entirety by reference.

TECHNICAL FIELD

The present invention relates generally to user management, and more particularly, but not exclusively, to managing users that may be non-compliant with the terms of their associated with a service provider.

BACKGROUND

Internal of external Service providers may spend significant resources to find, acquire, train, or otherwise on-board users. In many cases, service providers and user may enter into an association that requires the service provider to provide various services in exchange for the user complying with various conditions put forth by the service provider.

For example, an internal service provider may require users agree to various conditions, such as, password rules, providing signed documents that acknowledge allowed or prohibited activity, BYOD rules/restrictions, rules regarding data access or privacy protection for customers, or the like. Likewise, external service providers, such as, mobile telephone carriers, streaming media services, financial services, various other subscription or fee based services, or the like, may require users to comply with a variety of terms or conditions to maintain their relationship with the service provider.

In some cases, the cost of user acquisition requires that a user remain with a service provider for many months to recoup the costs of acquiring each user. However, in some cases, some of these valued users may become non-compliant or otherwise require specialized management to avoid losing the user whether is the user is a customer, student, or employee.

In some cases, organizations deploy expensive resources to help users remain in good standing or return to good standing rather than losing those users. However, since users may become non-compliant or become at risk for non-compliance for many reasons, personalized interventions may be advantageous. Also, in some cases, different users at risk for non-compliance may respond differently to various retention or restoration techniques. In some cases, a user may respond favorably to some retention tactics while at the same time another user may respond negatively to the same retention tactics. Accordingly, determining effective retention tactics for each user that may be at risk for becoming non-compliant may be difficult such that in worse case scenarios, retention tactics employed by an organization may result in actively driving some users away rather than rehabilitating them. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 5 illustrates a logical schematic of a portion of a system for dynamic user management platform in accordance with one or more of the various embodiments;

DETAILED DESCRIPTION OF VARIOUS EMBODIMENTS

Figure 1:
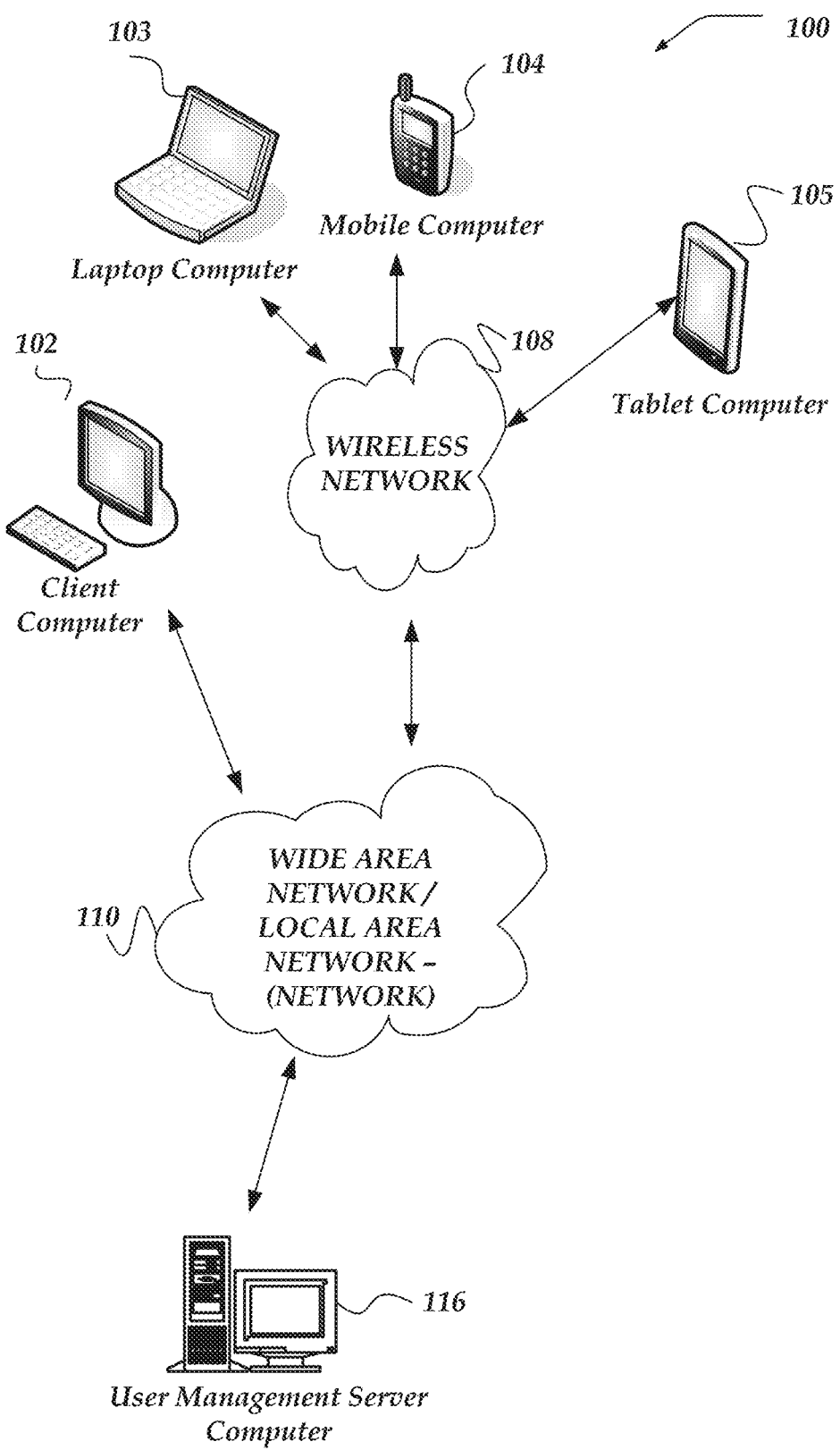
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, Python, R, Julia, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the term, "treatment action" refers to one or more data structures that may be arranged to include instructions, rules, templates, state machines, or the like, that may be used to execute actions for managing users. For example, a treatment action may include automatically generating message content that is sent to a user.

As used herein the term, "response information" refers to data or information provided as part a user's response to one or more treatment actions. In some cases, response information includes natural language text that requires additional processing to interpret. In other cases, response information may include user input provided via an application user interface.

As used herein the term, "treatment plan" refers to one or more data structures that may be arranged to include instructions, rules, templates, state machines, or the like, that may be used to execute one or more treatment actions for managing users. Treatment plans usually include a set of treatment actions. User management systems may be arranged to evaluate the efficacy of treatment plans while they are pending or at their conclusion.

As used herein the term, "playbook" refers to one or more data structures that may be arranged to include instructions, rules, templates, state machines, or the like, that may be used to execute one or more treatment actions for managing users. Playbooks usually include or reference a set of treatment plans. User management systems may be arranged to evaluate the efficacy of playbooks while they are pending or at their conclusion.

As used herein the term, "user model" refers to one or more data structures that may be arranged to include one or more heuristics, machine learning classifiers, formulas, conditions, instructions, parameters, or the like, or combination thereof. User models may be employed by a user management system to compare actual users. Users that fit a given user model may be users that have one or more characteristics or features that match criteria set forth by the user model. User models may be a combination of trained machine learning classifiers and heuristics. In some cases, user models may be heuristics or machine learning classifiers. Typically, user models may be employed to evaluate if a playbook, treatments, or the like, may be applicable to a given user.

As used herein the term, "result model" refers to one or more data structures that may be arranged to include one or more heuristics, machine learning classifiers, formulas, conditions, instructions, parameters, state machines, or the like, or combination thereof, that may be employed by a user management system to evaluate the results of treatment plans or playbooks. Results that fit or match result models may be considered to be providing expected or hoped for results. User management system may be arranged to employ response information from users as well as current user information as inputs to result models to determine if a pending treatment plan or pending playbook may be effective at producing the desired results. Result models may be a combination of trained machine learning classifiers and heuristics. In some cases, result models may be heuristics or machine learning classifiers. Typically, result models may be employed to evaluate if a playbook, treatments, or the like, if producing effective results.

As used herein the term, "evaluation point" refers to one or more data structures that may be arranged to include or reference computer readable instructions that trigger or initiate an evaluation of whether a treatment plan or playbook may be producing effective results. User management systems may be arranged to provide evaluation points before, during, or after the execution of treatment plans or playbooks.

As used herein the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing user associations with service providers. In one or more of the various embodiments, a status value for an association between a user and a service provider may be provided if a user may be non-compliant with one or more terms of the association. In one or more of the various embodiments, one or more user models may be employed to classify the user based on one or more of the status value or user information.

In one or more of the various embodiments, one or more treatment plans for the user may be determined from a plurality of treatment plans based on the classification of the user such that the one or more treatment plans are associated with one or more result models and one or more evaluation points. In one or more of the various embodiments, determining the one or more treatment plans may include: randomly selecting one or more experimental treatment plans that are separate from the plurality of treatment plans; substituting the one or more treatment plans with the one or more experimental treatment plans; comparing compliance by the user associated with the one or more experimental treatment plans to compliance by one or more other users associated with the plurality of treatment plans; and including the one or more experimental treatment plans in the plurality of treatment plans when the user complies with the one or more experimental treatment plans.

In one or more of the various embodiments, response information associated with the user may be generated based on execution of the one or more treatment plans such that the user information may be updated based on the response information. In one or more of the various embodiments, executing the one or more treatment plans, may include: determining one or more language models from a plurality of language models based on the one or more treatment plans and the user information; employing one or more determined language models to generate message content; and providing the message content to the user, wherein the message content is provided using one or more of text messages, mobile applications, email, web pages, automated voice calls, or interactive chat bots.

In one or more of the various embodiments, during execution of the one or more treatment plans at each evaluation point, the one or more result models may be employed to classify one or more of the response information or the updated user information.

In one or more of the various embodiments, in response to non-compliance by the user with one or more conditions of a current treatment plan, further actions may be performed, including: determining one or more other treatment plans based on the updated user information; executing the one or more other treatment plans to generate other response information associated with the user such that the user information associated with the user is further updated based on the other response information.

In one or more of the various embodiments, the status value may be updated to indicate one or more of an improvement or further reduction in compliance with the terms of the association based on completion or non-completion of at least one of the treatment plans or the other treatment plans.

In one or more of the various embodiments, one or more playbooks associated with the one or more treatment plans may be provided such that each playbook may be associated with one or more playbook user models. In some embodiments, the one or more playbook user models associated with the one or more playbooks may be employed to classify the user based on the user information. In some embodiments, a playbook may be associated with the user based on the classification that is based on the one or more playbook user models associated with the one or more playbooks. And, in some embodiments, the one or more treatment plans based on the associated playbook.

In one or more of the various embodiments, one or more language models may be determined from a plurality of language models based on the one or more treatment plans and the user information. In some embodiments, the one or more language models may be employed to determine one or more fragments of the response information that are correlated with one or more user intentions or one or more compliance goals. And, in some embodiments, one or more treatment actions may be determined based on the one or more user intentions or the one or more compliance goals.

In one or more of the various embodiments, the user information may be monitored to determine one or more metrics for a plurality of users of a service provider. And, in some embodiments, one or more users of the plurality of users that may be non-compliant with the one or more terms of the association with the service provider may be determined based on the one or more metrics exceeding a threshold value.

In one or more of the various embodiments, the one or more treatment plans may be modified based on the response information such that the modifications include one or more of extending deadlines, shortening deadlines, increasing a rate of performing one or more treatment actions, modifying the one or more evaluation points, jumping to another treatment plan, terminating a treatment plan, restarting a treatment plan, or the like.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, user management server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, user management server computer 116, or other computers.

Client computers 102-105 may further be configured to include a client application that enables an end-user to log into an end-user account that may be managed by another computer, such as user management server computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, user management server computer 116, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of user management server computer 116 is described in more detail below in conjunction with FIG. 3. Although FIG. 1 illustrates user management server computer 116 as a single computer, the innovations or embodiments are not so limited. For example, one or more functions of user management server computer 116, or the like, may be distributed across one or more distinct network computers. In one or more of the various embodiments, user management server computer 116 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
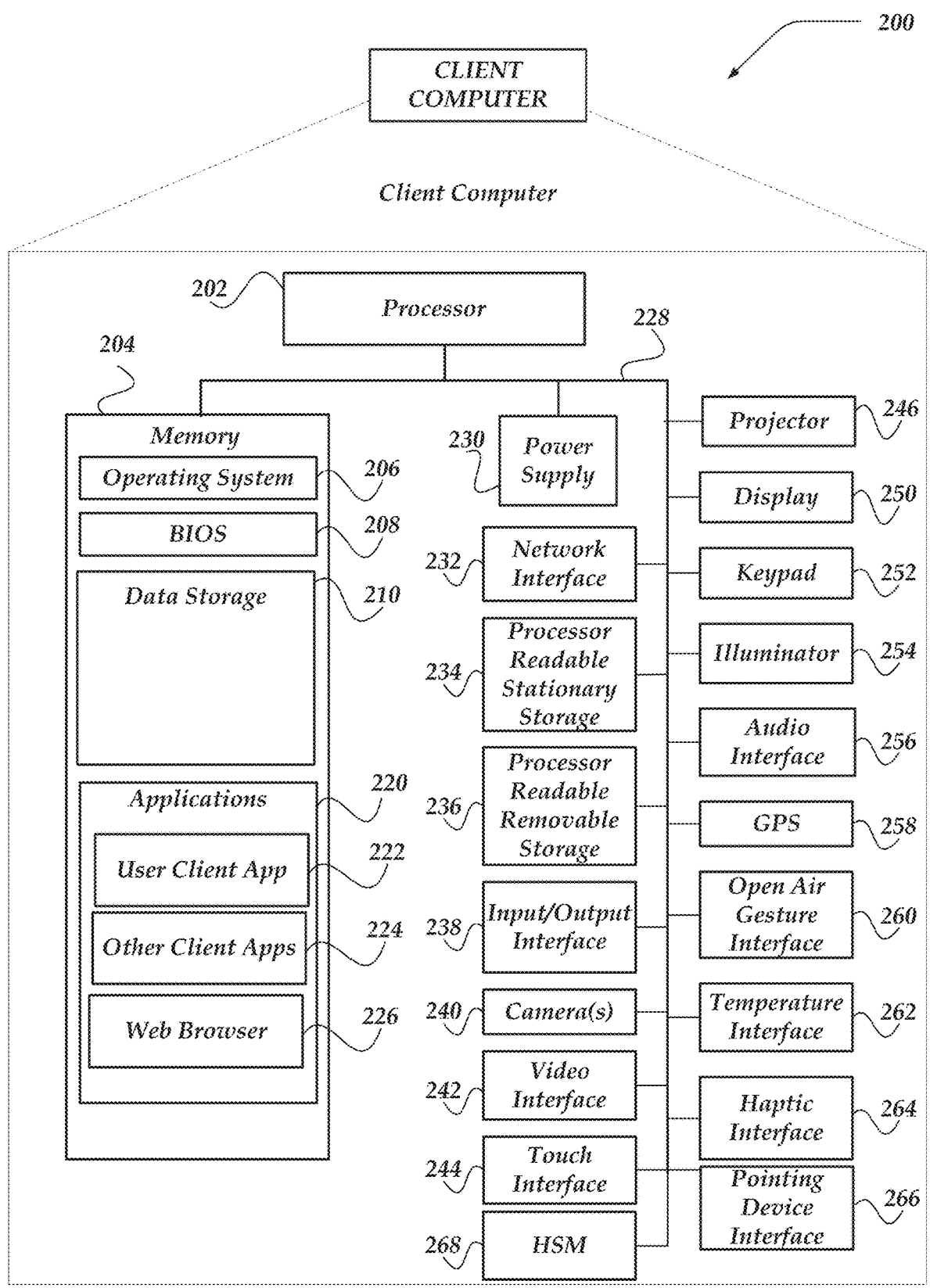
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, user client application(s) 222, other client applications 224, web browser 226, or the like. Client computers may be arranged to exchange communications, such as, queries, searches, messages, notification messages, event messages, alerts, performance metrics, log data, API calls, or the like, combination thereof, with application servers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
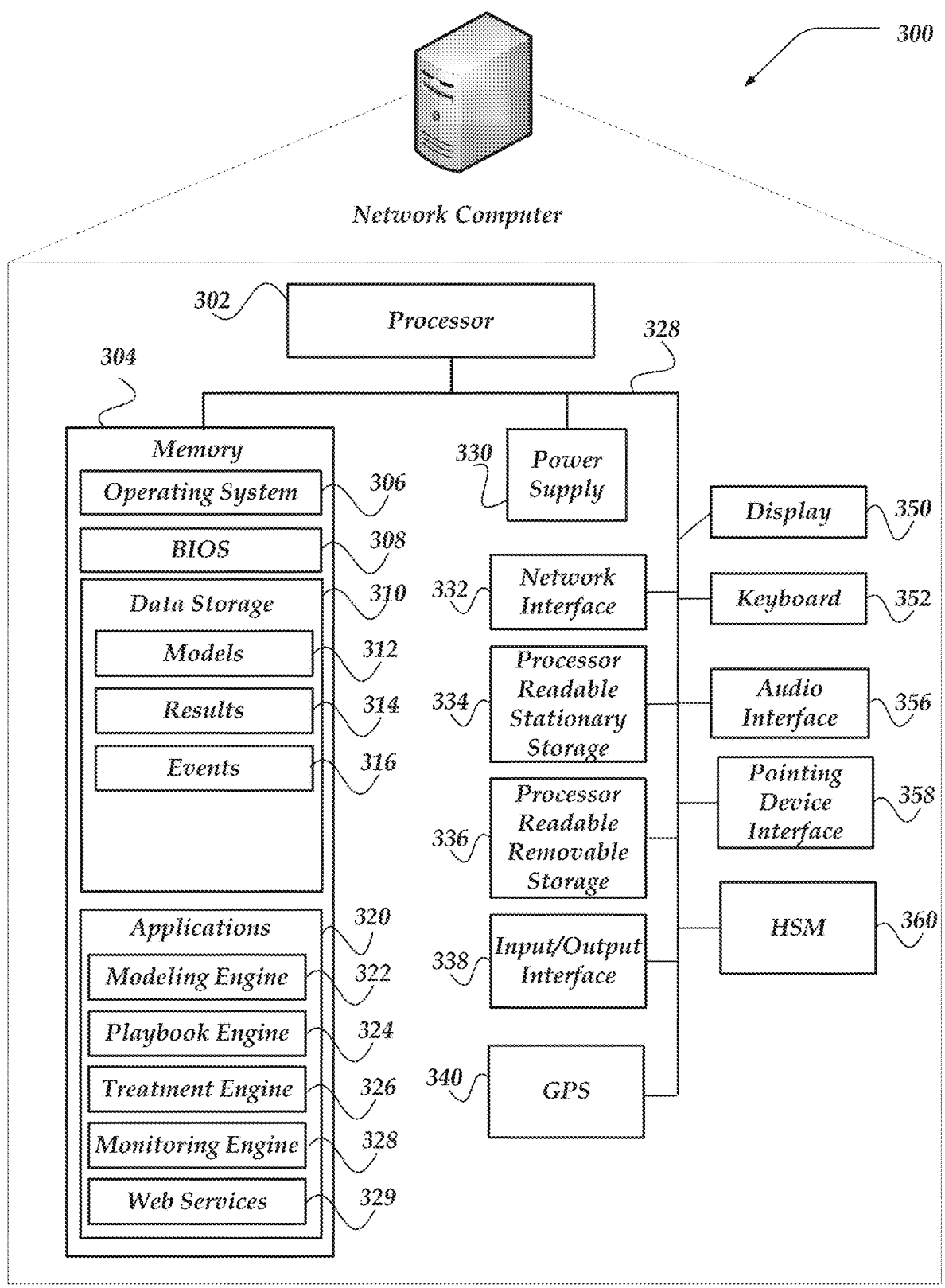
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of user management server computer 116 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, modeling engine 322, playbook engine 324, treatment engine 326, monitoring engine 328, web services 329, or the like, may be arranged to employ geo-location information to select one or more localization features, such as, time zones, languages, currencies, calendar formatting, or the like. Localization features may be used when interpreting network traffic, monitoring application protocols, user-interfaces, generating reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data.

For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, models 314, results 316, events 318, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include modeling engine 322, playbook engine 324, treatment engine 326, monitoring engine 328, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, modeling engine 322, playbook engine 324, treatment engine 326, monitoring engine 328, web services 329, or the like, may be operative in a cloud-based computing environment. In one or more of the various embodiments, these applications, and others, that comprise a network monitoring computer may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to modeling engine 322, playbook engine 324, treatment engine 326, monitoring engine 328, web services 329 or the like, may be provisioned and de-commissioned automatically.

Also, in one or more of the various embodiments, modeling engine 322, playbook engine 324, treatment engine 326, monitoring engine 328, web services 329, or the like, may be located in virtual servers running in a cloud-based computing environment rather than being tied to one or more specific physical network computers. Likewise, in some embodiments, one or more of modeling engine 322, playbook engine 324, treatment engine 326, monitoring engine 328, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
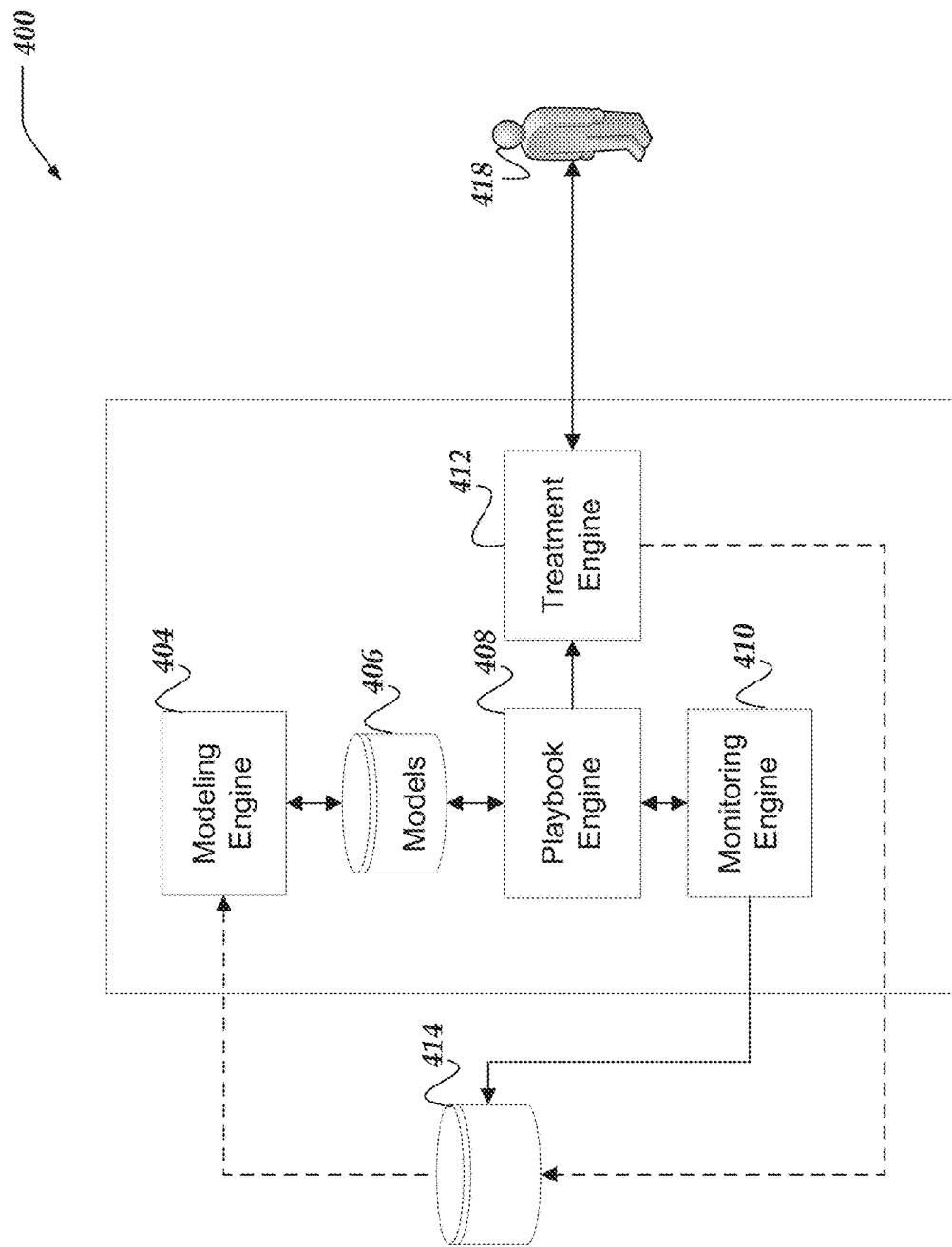
FIG. 4 illustrates a logical architecture of a system for dynamic user management platform in accordance with one or more of the various embodiments.

FIG. 4 illustrates a logical architecture of system 400 for dynamic user management platform in accordance with one or more of the various embodiments. In one or more of the various embodiments, system 400 may be hosted or executed by one network computers, such as, user management server computer 116, or the like. In one or more of the various embodiments, system 400 may include: one or more modeling engines, such as, modeling engine 404; one or more model data stores, such as, model store 406; one or more playbook engines, such as, playbook engine 408; one or more treatment engines, such as, treatment engine 412; one or more monitoring engines, such as, monitoring engine 410; or the like. Also, in one or more of the various embodiments, system 400 may be arranged to be include one or more user activity/event data stores, such as, user information data store 414, or the like.

In one or more of the various embodiments, system 400 may be arranged to manage users associated with one or more service providers. Accordingly, in one or more of the various embodiments, system 400 may be arranged to identify one or more users that meet one or more specified criteria. In some embodiments, users may be evaluated based on user information that may include previously collected activity or event information that may be stored in data store 414, or the like.

In one or more of the various embodiments, identified users may be users that may benefit from specialized attention. In one or more of the various embodiments, the particular benefit or specialized attention may vary depending on an organizations needs or other local circumstances. In some embodiments, the identified used may be used that may be at-risk of becoming or remaining non-complaint with respect to one or more terms or conditions of the association with the service provider.

In one or more of the various embodiments, the users may be users associated with an external/third-party service provider, such as, a mobile telephone carrier, content providers, product sellers, other subscription or fee based services, or the like. In some embodiments, users may be associated with an ongoing prior or current relationship with the service provider. For example, in some embodiments, users may be subscribers to mobile communication carriers, cellular service carriers, or the like.

Also, in one or more of the various embodiments, services may include enterprise services or otherwise internal services that may have rules, conditions, terms, or the like, associated with enabling users to access to a given service. For example, in some embodiments, an enterprise's internal email service may be considered a service provider that requires users to meet various terms or requirements to continue to enjoy access.

In one or more of the various embodiments, the relationship between the user and service provider may deteriorate to point that there is a risk that user may be lost. In some cases, the deterioration of the relationship may be based on a user's failure to remain current or compliant with one or more obligations to the service provider. For example, in one or more of the various embodiments, service providers may engage users via subscriptions or other periodic billing arrangements. Thus, for example, if users fall behind in payments, the service provider may be forced to sever their relationship with the user. Also, in some cases, other factors associated with a user vendor relationship may result in a deterioration of the user-vendor relationship, such as, service quality, equipment quality, product quality, or the like.

Similarly, in some embodiments, users that become or remain non-compliant with respect to internal/enterprise service providers may ultimately be denied access to the respective service or removed from the organization. For example, if an enterprise email system may require users to successfully complete various email security training to retain access rights to the enterprise email system. Thus, in this example, a user that may be failing to successfully complete the required training programs may be determined to be an at-risk user that requires specialized effort to retain the user.

Because, in one or more of the various embodiments, establishing associations with users, whether they be customers, students, employees, or otherwise may be expensive for service providers for various reasons, such as, marketing expenses, new user discounting, other on-boarding costs, recruiting fees, time spend during interviews, or the like, that may be associated with obtaining users. Accordingly, in one or more of the various embodiments, early identification of user association at risk for deterioration may be advantageous to service providers. In some embodiments, early identification may enable service providers to attempt to rehabilitate deteriorating user associations or more advantageously to avoid any deterioration altogether.

In one or more of the various embodiments, monitoring engines, such as, monitoring engine 410 may be arranged to monitor user information, such as, user activity, user events, user status, or the like. In some embodiments, if the monitored user information indicates that a user may be at risk for becoming a non-compliant with terms of their associated with the service provider, a playbook engine, such as, playbook engine 408 may be engaged to determine one or more actions to take that may reduce the risk of the association between the user and the service provider from deteriorating further. Or, in some embodiments, the one or more actions may be directed rehabilitate the association between an at-risk user and the service provider.

In one or more of the various embodiments, treatment engines, such as treatment engine 412 may be arranged to execute various treatment actions associated with attempts to rehabilitate user associations. Accordingly, in some embodiments, treatment engine 412 may be arranged to execute various treatment actions directed at users, such as, user 418. Also, in some embodiments, treatment engines may be arranged to process or evaluated response information associated with one or more treatment actions, such as, responses, events, or the like. Further, in some embodiments, treatment engines may be arranged to update user information that may be stored in data store 414 based on the response information associated with the one or more actions.

In one or more of the various embodiments, playbook engines may be arranged to employ one or more playbooks that may be executed to rehabilitate at risk users. In some embodiments, playbooks may be associated one or more treatment plans that define the treatment actions to take to rehabilitate at risk users.

Accordingly, in one or more of the various embodiments, at-risk users may be assigned or associated with a playbook that encapsulates one or more treatment plans that may be executed to rehabilitate the users. As described below in more detail, playbooks may include references to one or more treatment plans that may be executed to perform the detailed actions and to process the results of the actions taken.

In one or more of the various embodiments, modeling engines, such as, modeling engine 404 may be arranged to generate, update, or modify, one or more user models, that may be used to select playbooks or treatments plans for a user. Also, in some embodiments, modeling engines may be arranged to generate, update, or modify, one or more result models that may be used to evaluate the results of the execution of playbooks or treatment plans with respect to rehabilitating at-risk users.

In one or more of the various embodiments, monitoring engines, such as, monitoring engine 410 may be arranged to monitor user information to determine, in part, if a user may be at-risk. In some cases, monitoring engines may be arranged to monitor one or more user metrics to determine users that may be have the potential to be considered at-risk. In some embodiments, monitoring engines may be arranged to identify users that have a potential for being considered at-risk based on one or more metrics exceeding threshold values defined by the service provider. In one or more of the various embodiments, dedicated user models may be arranged to be employed to determine if a user may be at-risk. In some embodiments, such user models may be arranged to classify, match, or otherwise identify users that may be at-risk.

Alternatively, in some embodiments, monitoring engines may be arranged to act as a first level filter to identify users that may have the potential for becoming at-risk. In such embodiments, the identified users may be provided to a playbook engine that may determine if any of the identified users should be assigned a playbook for rehabilitation. Accordingly, in one or more of the various embodiments, the playbook engine may be arranged to iterate through one or more playbooks and employ user models associated with each playbook to determine if an identified user should be assigned or associated with a given playbook.

In one or more of the various embodiments, playbook engines or treatment engines may be arranged to generate customized or specialized interfaces for user 418. In some embodiments, such user interfaces may include emails, automated voice systems, SMS texts, letters (hard copy), mailing material, web landing pages, or the like. In some embodiments, organizations may offer interfaces for users that may be in part generated based on treatment plans or playbooks that may be associated with users. For example, in some embodiments, treatment plans, or the like, may include templates, conditions, rules, or the like, that may be employed to generated personalized web portal landing pages for users. Thus, in some embodiments, if a user associated with the a treatment plan or playbook signs into a web portal for the organization, the landing page may be customized specifically for the user based on the treatment plan or the user's progress in completing or responding to treatment actions.

FIG. 5 illustrates a logical schematic of a portion of system 500 for dynamic user management platform in accordance with one or more of the various embodiments. In one or more of the various embodiments, system 500 may be arranged to include a plurality of playbooks that may be stored in a playbook data store, such as, playbook data store 502, or the like. In some embodiments, playbook data stores may be arranged to include one or more playbooks, such as, playbook 504.

Also, in one or more of the various embodiments, system 500 may be arranged to include one or more treatment plan data stores, such as, treatment plan data store 506. In some embodiments, treatment plan stores, such as, treatment plan store 506 may be arranged to include one or more treatment plans, such as, treatment plan 508.

In one or more of the various embodiments, playbook 504 may be arranged to reference a particular set of treatment plans, such as, treatment plans 512. In some embodiments, more than one playbook may reference the same treatment plan.

Accordingly, in one or more of the various embodiments, if a playbook engine determines a playbook for a user, the one or more treatment plans associated with the determined playbook may be likewise determined.

In one or more of the various embodiments, user management systems may be arranged to include a plurality of experimental treatment plans or experimental playbooks (not shown). In some embodiments, the plurality of experimental treatment plans may include new or alternative treatment plans that may not be approved or vetted for general application. Accordingly, in one or more of the various embodiments, as experimental treatment plans are approved for general application, they may be included in treatment plan data store 506 or otherwise made available for general application. Likewise, in some embodiments, as experimental playbooks are approved for general application, they may be included playbook data store 502 or otherwise made available for general application.

Figure 6:
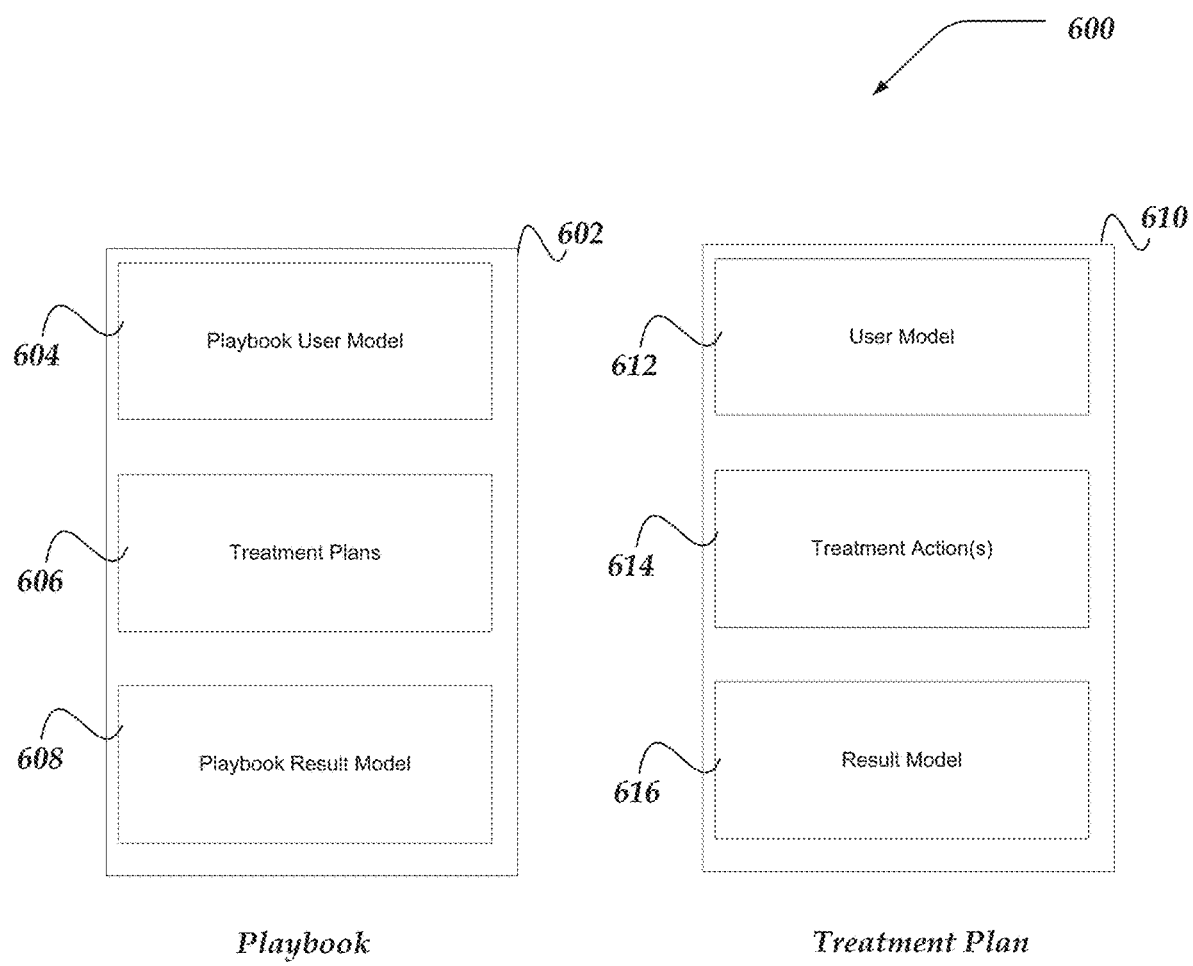
FIG. 6 illustrate a logical schematic of a portion of a user management system for dynamic user management platform in accordance with one or more of the various embodiments.

FIG. 6 illustrate a logical schematic of a portion of user management system 600 for dynamic user management platform in accordance with one or more of the various embodiments. As described above, user management systems may be arranged to include one or more playbooks and one or more treatment plans.

In one or more of the various embodiments, playbooks, such as, playbook 602 may be arranged to include (or reference) one or more user models, such as, user model 604, one or more treatment plans, such as, treatment plans 606, one or more result models, such as, result model 608.

In one or more of the various embodiments, user models may be analytic models that may be arranged to identify, match, or classify users. Accordingly, in some embodiments, user models associated with playbooks may be employed to determine if a user should be assigned a given playbook.

Accordingly, in one or more of the various embodiments, if a user may be assigned a playbook based on a match with a user model, the treatment plans associated with the playbook may be initiated.

In some embodiments, one or more playbooks may be associated with one or more result models, such as, result model 608. In some embodiments, result models may be employed to evaluate the performance of the associated playbook. Accordingly, in some embodiments, results that match or are otherwise consistent with a playbooks result model may indicate the playbook may be performing as expected.

Similarly, in one or more of the various embodiments, treatment plans, such as, treatment plan 610 may be arranged to include (or reference), one or more user models, such as, user model 612, one or more treatment actions, such as, treatment actions 614, one or more result models, such as, result model 616. Similar to playbooks described above, user model 612 may be arranged to determine if a treatment plan may be appropriate for a given user.

In one or more of the various embodiments, treatment actions 614 represent the rules, computer readable instructions, or the like, that may be employed to execute one or more actions associated with a treatment plan. In one or more of the various embodiments, treatment actions may include generating message content for one or more text based communications with an at-risk user, such as, email messages, text messages, conventional letters/correspondence, synthesized voice messages, or the like. Further, in some embodiments, treatment actions may include generating or providing specialized/customized message content via mobile applications, web applications, desktop applications, or the like.

Also, similar, to playbooks, in some embodiments, treatment plans may be associated with one or more result models, such as, result model 616. In some embodiments, result models associated with treatment plans may be employed to evaluate the results associated with execution of a given treatment plan. In one or more of the various embodiments, result models may indicate that a current treatment plan may be failing or otherwise producing unsatisfactory result. Accordingly, in some embodiments, the result model may indicate that a new treatment plan should be selected. Or, similarly, in some embodiments, the result model may indicate that the current treatment action has failed or otherwise produced an unsatisfactory result. In some embodiments, in some embodiments, depending on how a treatment plan may be arranged, the failure of a treatment action may result in the treatment plan performing various actions, depending on the circumstances or the treatment plan, such as, retrying the same treatment actions, branching to different treatment action that is part of the same treatment plan, modifying a currently pending treatment actions, or the like.

In some embodiments, actions that contact or communicate with users may be modified such that they generate more or fewer contacts depending on the time of day, day of weeks, holiday considerations, or the like. In some embodiments, if modifications are built into the treatment plans, these modifications may occur automatically as response information associated with a user is provided. For example, in some embodiments, a next action in a treatment plan may be to execute a telephone call that plays a recorded reminder message for a user, such as, an appointment reminder. However, in this example, if the call would be made at a disruptive or inconvenient time the time of the call may be automatically adjusted to a better time. In some embodiments, in one or more of the various embodiments, the result model, treatment plan, or the treatment actions themselves may be arranged to include rules, conditions, or the like, to automatically perform needed modifications.

Further, in one or more of the various embodiments, treatment plans may be arranged to vary the rate of actions based on the responsiveness of individual users. Likewise, in one or more of the various embodiments, the rate of actions may be varied based on response information associated with cohorts of users or historical response associated with a playbook, treatment plan, or treatment action. Accordingly, in some embodiments, treatment engines may be arranged to automatically adjust some deadlines, delays, reminder scheduling, based on the responses of an individual user or cohort of users.

Figure 7:
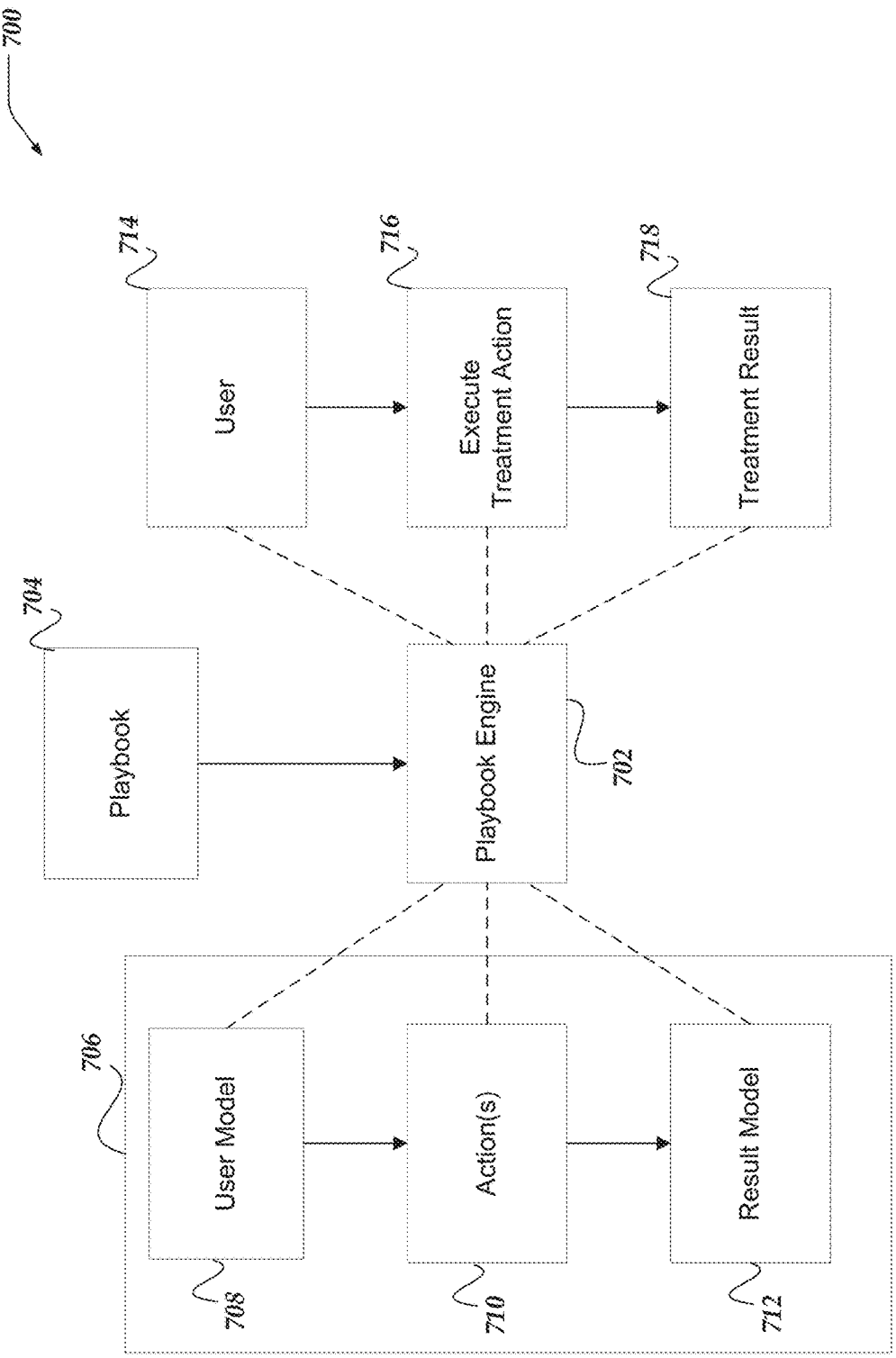
FIG. 7 illustrates a logical schematic of a portion of a user management system for dynamic user management platform in accordance with one or more of the various embodiments.

FIG. 7 illustrates a logical schematic of a portion of user management system 700 for dynamic user management platform in accordance with one or more of the various embodiments. In one or more of the various embodiments, playbook engine 702 may be arranged to employ playbook 704 to attempt to rehabilitate an at-risk user. Accordingly, in one or more of the various embodiments, playbook engine 702 may be arranged to iterate through one or more treatment plans associated with playbook 704. In this example, for some embodiments, treatment plan 706 may be considered to represent a treatment plan associated with playbook 704. Accordingly, in some embodiments, user model 708 may be arranged to determine if treatment plan 706 may be suitable for the user (e.g., user 714). Also, in some embodiments, actions 710 may define the specific treatment actions associated with treatment plan 706. And, in this example, result model 712 may be arranged for evaluating the results of the performed treatment actions.

In this example, user 714 represents a user that has been assigned playbook 704. Accordingly, in some embodiments, a user model associated with playbook 704 (not shown) may be assumed to have matched user 714.

In one or more of the various embodiments, actions associated with a current treatment plan (e.g., treatment plan 706) may be executed by or in execution block 716. In some embodiments, execution block 706 may be considered one or more of a process, service, thread of execution, or the like, that may perform the actions for a treatment plan. In some embodiments, execution block 716 may be a remote service, third-party service, local process or program, or an in-process execution context that may be considered executing within playbook engine 702 or a treatment engine (not shown).

Accordingly, in some embodiments, treatment result 718 may be the on-going results or response information that may be associated with executed actions. Accordingly, in some embodiments, response information associated with executed actions for a particular user may be evaluated against a result model, such as, result model 712.

In some embodiments, evaluation points may be considered points in the execution of a playbook where the current results for the playbook as a whole or a particular treatment plan may be evaluated. In some embodiments, evaluation points may be defined to occur before or after one or more treatment actions may be executed. Also, in some embodiments, evaluation points may be defined before or after the execution of a treatment plan or before or after the execution of a playbook.

In one or more of the various embodiments, evaluation points associated with treatment actions may trigger the playbook engine to evaluate the current results of a treatment plan with using its associated result model, such as, result model 712.

In one or more of the various embodiments, user management systems may be arranged to enable service providers to register one or more evaluation actions at different points in the user management workflow. In some embodiments, evaluation actions may be defined based on configuration information, or the like, to account for local circumstances. For example, in some embodiments, service provider A may want to use the user management system to evaluate at-risk users at the completion of each treatment actions for a given treatment plan while service provider B may want to evaluate at-risk users before some treatment action may be attempted as well as after some treatment actions are completed.

In one or more of the various embodiments, playbook engines may be arranged to dynamically switch playbooks or treatment plans depending on the evaluation of the results. For example, in some embodiments, unexpected results may trigger the playbook engine to switch to a next treatment plan in the current playbook. Likewise, in some embodiments, result models associated with a pending playbook (not shown) may trigger the abandonment of the pending playbook.

Figure 8:
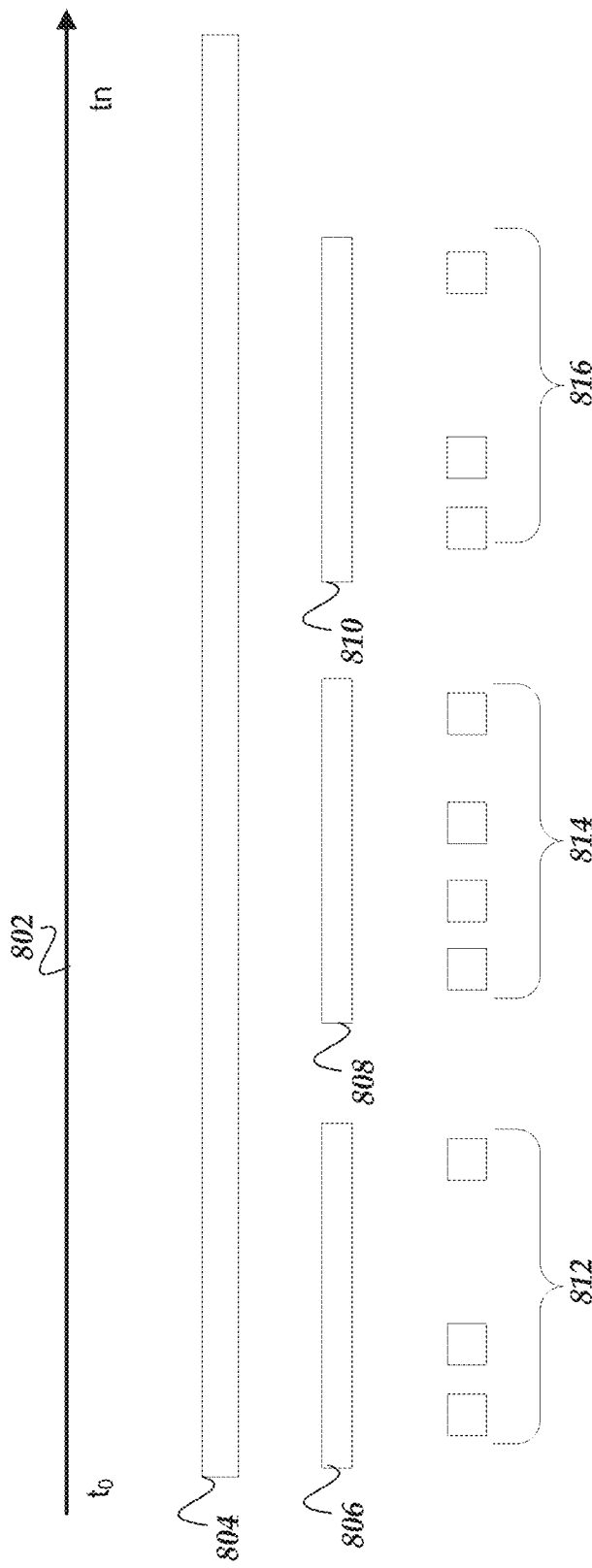
FIG. 8 illustrates a logical schematic of the execution of a playbook for a dynamic user management platform in accordance with one or more of the various embodiments.

FIG. 8 illustrates a logical schematic of the execution of a playbook for dynamic user management platform in accordance with one or more of the various embodiments. In this example, ray 802 represents the passage of time from t0 to tn.

In some embodiments, a playbook, such as, playbook 804 may be determined for an at-risk user. As described above, playbook engines may be arranged to associate a playbook to at-risk users based on a user model associated with the playbook. Accordingly, in some embodiments, users may be classified by a user model to playbooks that may be a good fit for them.

Further, in this example, the treatment plans associated with playbook 804, include treatment plan 806, treatment plan 808, or treatment plan 810. Also, in this example: treatment plan 806 may be associated with one or more treatment actions, such as, treatment actions 812; treatment plan 808 may be associated with one or more treatment actions, such as, treatment actions 814, treatment plan 810 may be associated with one or more treatment actions, such as, treatment actions 816.

In this example, a playbook engine (not shown) may be arranged to begin executing playbook 804 by starting treatment plan 806. Accordingly, in some embodiments, the playbook engine may begin execution the first treatment action of treatment actions 812. Thus, in this example, for some embodiments, if the first action of treatment plan 806 is performed, the playbook engine may execute the next actions, and so on. At the completion, of treatment 806, the playbook engine may begin executing the actions associated with treatment 808, and so on.

Also, in one or more of the various embodiments, evaluation points may be associated with different/various steps or stages of the treatment process. In one or more of the various embodiments, one or more evaluation points may be registered before or after the execution of the various treatment plans or treatment actions associated with a playbook. Accordingly, in some embodiments, at each evaluation point, the user information, response information, or the like, may be classified using one or more result models to evaluate if the respective playbook or treatment plan may be producing the hoped for or expected outcomes.

Generalized Operations

FIGS. 9-12 represent generalized operations for dynamic user management platform in accordance with one or more of the various embodiments. In one or more of the various embodiments, processes 900, 1000, 1100, and 1200 described in conjunction with FIGS. 9-12 may be implemented by or executed by one or more processors on a single network computer such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 9-12 may be used for dynamic user management platform in accordance with at least one of the various embodiments or architectures such as those described in conjunction with FIGS. 4-8. Further, in one or more of the various embodiments, some or all of the actions performed by processes 900, 1000, 1100, and 1200 may be executed in part by modeling engine 322, playbook engine 324, treatment engine 326, monitoring engine 328, or the like, running on one or more processors of one or more network computers.

Figure 9:
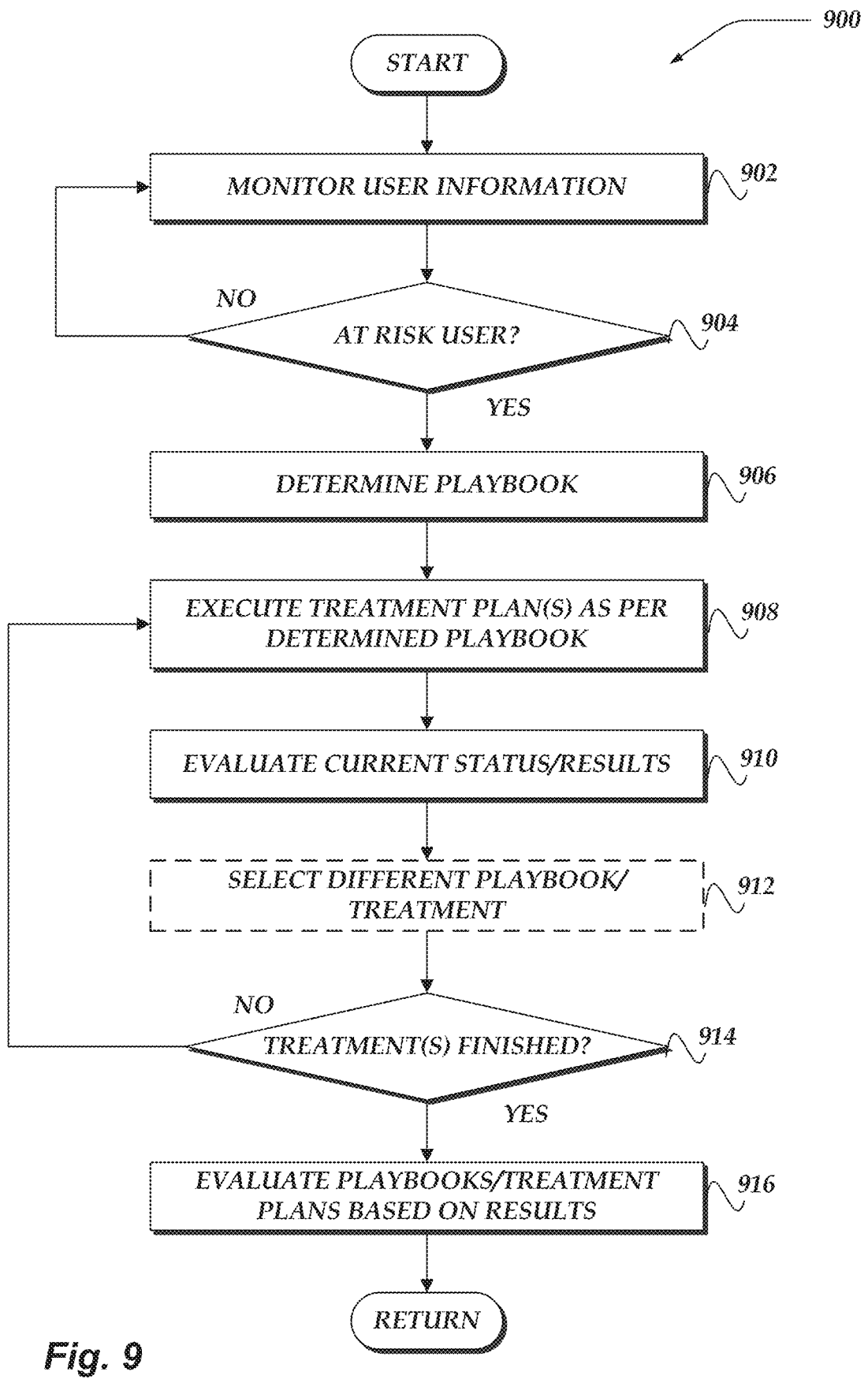
FIG. 9 illustrates an overview flowchart of a process for dynamic user management platform in accordance with one or more of the various embodiments.

FIG. 9 illustrates an overview flowchart of process 900 for dynamic user management platform in accordance with one or more of the various embodiments. After a start block, at block 902, in one or more of the various embodiments, user management systems may be arranged to monitor user information to identify service provider users that may be at risk for ending failing to comply with the terms of their association with the service provider (e.g., at-risk users).

In one or more of the various embodiments, the criteria for identifying users having the potential to become at-risk may vary depending on the interests of the service provider, local circumstances, or the like. For example, in some embodiments, at-risk users may be users that may be considered at-risk because the service provider may have to sever the relationship with the user because the user may default on their financial obligations to the service provider. Also, for example, at-risk users may be users determined to be at-risk of ending their relationship with the service provider for other reasons, such as, lack of satisfaction with the service provider or its offered services. Further, in one or more of the various embodiments, if the service provider is an internal service provided for employees of an organization or enterprise, at risk users may be employees that may be at-risk of separation for various reasons, such as, failure to comply with email policies, BYOD policy non-compliance, failing to successfully complete compliance training/testing, or the like. For example, if an employee has failed to participate in mandatory information security training, that employee may be considered an at-risk user since they may be at-risk of separation for non-compliance with information security policies of their employer.

In one or more of the various embodiments, customer management systems may employ one or more monitoring engines to evaluate one or more user metrics based on or derived from user information. In some embodiments, user information may include information that may be associated with the terms of the association between the service provider its users. For example, in some embodiments, user information may include information related to one or more of user finance information, delinquency history, balances owed, household information, customer service interactions, help-desk interactions, product returns, refund requests, training history, attendance records, discipline notices, or the like.

In one or more of the various embodiments, monitoring engines may be arranged to identify potential or actual at-risk users. In one or more of the various embodiments, such users may be identified based on criteria associated with the type of relationship the service provider has with the user or the type of risk that may put relationship with the user at risk, such as, lack of payment, or the like. Also, in one or more of the various embodiments, monitoring engines may be arranged to identify potential or actual at-risk users based on criteria associated with reasons that a user may have for ending their relationship with the service provider, such as, repeated support contacts, product/device returns, or the like.

Accordingly, in one or more of the various embodiments, monitoring engines may be arranged to employ criteria for identifying potentially at-risk users based on rules, instructions, or the like, provided via configuration information.

In one or more of the various embodiments, monitoring engines may be arranged to periodically query user information to identify users that may be of interest. Also, in some embodiments, monitoring engines may be arranged to employ one or more tripwires or triggers that may automatically identify users of interest based on changes to one or more metrics associated with a given user.

In one or more of the various embodiments, monitoring engines may be arranged to act as a low resource mechanism to quickly identify potential at-risk users. Accordingly, in some embodiments, monitoring engines may be arranged to compare one or more user metric values to defined threshold values to identify users of interest rather than employing user models to match or classify users to determine if they may be at-risk.

However, in some embodiments, monitoring engines may be arranged to employ user models to initially identify potential or actual at-risk users. Also, in some embodiments, monitoring engines may be arranged to exclusively use user models to identify users of interest such that a user may be definitively determined to be at-risk based on user models. For example, in some embodiments, monitoring engines may be arranged to employ user models to classify each user to identify the at-risk users.

In one or more of the various embodiments, user management systems may be arranged to employ user models associated with one or more playbooks to determine if a user may be at-risk. Accordingly, in some embodiments, user management systems may be arranged to determine that a user is at-risk if it matches a user model associated with one or more playbooks. In some embodiments, users that match a user model associated with a given playbook may be determined at-risk such that the matched playbook(s) may be initially employed to attempt rehabilitate the matched user.

At decision block 904, in one or more of the various embodiments, if one or more at-risk users may be determined, control may flow to block 906; otherwise, control may loop back block 902 for continued monitoring of user information.

At block 906, in one or more of the various embodiments, playbook engines may be arranged to determine an initial playbook for the one or more at-risk users. As described above, playbooks include or reference one or more treatment plans that may be executed to rehabilitate a relationship between at-risk users and service providers by performing actions that may bring an at-risk user back into compliance with the terms of the association between the service provider and the user.

In one or more of the various embodiments, a user may be associated with a playbook based on the results provided by classifying a user using user models. In some embodiments, a playbook may include a user model that may be employed to determine if the playbook should be assigned to a user. In some embodiments, user models employed for risk determination may be arranged to reference a particular playbook rather than being included in a playbook.

In some embodiments, a single user model may be used to classify at-risk users. Accordingly, in some embodiments, the classification result may be employed to determine a particular initial playbook for an at-risk user. For example, users determined to be at a first stage of risk based on missed payments may be automatically assigned a playbook that includes treatment plans arranged to help the user payoff unpaid balances or otherwise catch up with their payments. Similarly, for example, other users determined to be at a first stage of risk based on poor user satisfaction may assigned to a playbook that includes treatment plans arranged to improve the user's satisfaction with the service provider.

In one or more of the various embodiments, employing a user model to classify a user may include providing a score that indicates how well a given user model matches a given user. Thus, in some embodiments, users may be associated with a playbook that resulted in the highest match score. In some embodiments, user models may classify users using machine learning based on models. Alternatively, in some embodiments, user models may be arranged to classify users by employing one or more heuristics, such as, comparing one or more user metrics (based on user information) to threshold values, or the like.

In some embodiments, one or more of user management system administrators or service provider administrators may be enabled manually associate at-risk users with particular playbooks.

At block 908, in one or more of the various embodiments, playbook engines or treatment engines may be arranged to execute one or more treatment plans based on the current playbook. As described above, playbooks may be associated with one or more treatment plans that each may be associated with one or more treatment actions. Accordingly, in one or more of the various embodiments, playbook engines may be arranged to orchestrate the process of executing treatment plans while treatment engines may be arranged to orchestrate to execution of specific treatment actions.

In some embodiments, playbook engines and treatment engines may be combined into a single engine that performs the actions of a playbook engine and a treatment engine rather than requiring playbook engines and treatment engines to be separate engines.

At block 910, in one or more of the various embodiments, playbook engines, treatment engines, modeling engines, or the like, may be arranged to evaluate the current status of the one or more at-risk users. In one or more of the various embodiments, treatment actions associated with treatment plans or playbooks may produce result information associated with the executed treatment actions. In some embodiments, result information associated with individual treatment actions may be evaluated to determine how or if an at-risk user may be responding to a given treatment action. In some embodiments, result information may be derived from response information provided by at-risk users in response to one or more treatment actions.

In one or more of the various embodiments, treatment plans may be comprised of one or more treatment actions. In one or more of the various embodiments, treatment actions may include providing auto-generated message content to at-risk users. Accordingly, in some embodiments, user responses to the auto-generated message content may be employed guide further actions.

In one or more of the various embodiments, treatment actions may include providing message content to at-risk user using text messages, mobile applications, email, web pages, automated voice calls, interactive chat bots, or the like, or combination thereof. Accordingly, in one or more of the various embodiments, a treatment plan may be arranged to execute a series of treatment actions that may result in back forth interactions with at-risk users.

In one or more of the various embodiments, treatment plans may include one or more evaluation points that trigger the user management system to evaluate if the current treatment plan may be effective. In some embodiments, evaluation points may be assigned at different points in a treatment plan, such as, before one or more actions, after one or more actions, before the treatment plan starts, after the treatment plan has completed, or the like.

In one or more of the various embodiments, treatment plans may be associated with a result model that may be employed to determine if the treatment plan is producing the desired or expected results. Accordingly, in one or more of the various embodiments, as at-risk users provide response information in response to treatment actions, the plan may be evaluated based on some or all of the response information or the updated user information.

In some embodiments, treatment actions may solicit natural language responses from at-risk users. Accordingly In one or more of the various embodiments, user management systems may be arranged to employ language processing engines that may be arranged to support various natural language models. Accordingly, in one or more of the various embodiments, the language processing engines may be employed to interpret or classify text based (emails, chats, SMS texts, or the like) that may be part of at-risk user response information.

In one or more of the various embodiments, some treatment actions may provide message content that offers a defined set of choices that an at-risk user may choose from. In some embodiments, this may enable the response information to be directly processed rather than requiring natural language processing to interpret.

Likewise, in one or more of the various embodiments, if a treatment plan may be completed, the result information associated with the treatment plan may be evaluated as a whole. In some embodiments, the user information associated with the at-risk user may be evaluated as well as the response information. For example, if the response information indicates that a user has agreed to perform a requested action, such as, registering to take a requirement training course within an agreed time period, the past history of the user (e.g., user information) may be considered to determine the veracity of the user's response. For example, if the user routinely registers for training courses then fails to attend them, simply agreeing to register for a training course may not indicate that this user will actually attend. In contrast, for example, if a user's history indicates that they always attend training courses they are registered to attend, the treatment plan may be determined to be guiding the at-risk user into compliance.

At block 912, in one or more of the various embodiments, optionally, playbook engines may be arranged to determine another playbook for one or more of the at-risk users.

In one or more of the various embodiments, playbooks or treatment plans may be arranged to have one or more evaluation points. Accordingly, in one or more of the various embodiments, at each evaluation point, the efficacy of the current treatment plan or the current playbook may be evaluated. In some cases, for some embodiments, the user management system may determine that the current playbook or treatment plan is not producing the expected or desired results. Likewise, in some embodiments, the playbook engine may determine that the current playbook may not be producing the expected or desired results.

Accordingly, in some cases, the playbook engine may determine that the current treatment plan or playbook may be interrupted and a different treatment plan or playbook may be selected.

Thus, in one or more of the various embodiments, the actions taken to rehabilitate at-risk users may dynamically change based on immediate results of one or more treatment actions or treatment plans.

Further, in some embodiments, playbooks engines or treatment engines may be arranged to modify treatment actions based on load-balancing considerations to enable contacts or communication with users to be spread out across defined windows of time based on user circumstances.

At decision block 914, in one or more of the various embodiments, if the treatment for the current treatment plan may be finished, control may flow to block 916; otherwise, control may loop back to block 908.

At block 916, in one or more of the various embodiments, modeling engines may be arranged to update one or more of the models associated with the one or more users, the playbooks, the treatment plans, or the like. In some embodiments, the performance history associated with playbooks, treatment plans, or the like, may be recorded for future analysis.

In some embodiments, playbooks or treatment plans may be evaluated based on how many at-risk users may be brought back into compliance. For example, in some embodiments, this may include measuring the number of at-risk users that may be brought into compliance versus the number of at-risk users whose association with the service provider may be terminated.

For example, in some embodiments, the user models used to associate at-risk users with a playbooks or treatments may be determined to be ineffective based on assigning users to treatment plans that fail to produce the desired outcome.

Accordingly, in some embodiments, under-performing treatment plans or playbooks may be removed from general application. In other embodiments, under-performing playbooks or treatment plans may be associated with different user models that may identify at-risk users that may be better suited for a given treatment plan.

Likewise, in some embodiments, experimental treatment plans that include different treatment actions or different result models may be introduced to determine if they may provide better outcomes.

In some embodiments, user models may be modified to refine which playbooks or treatment plans may be associated with a given at-risk user. In some embodiments, machine learning may be employed to train classifiers that may be employed in user models to identify users that may benefit from a particular playbook or treatment plan.

Next, in one or more of the various embodiments, control may be returned to a calling process.

Figure 10:
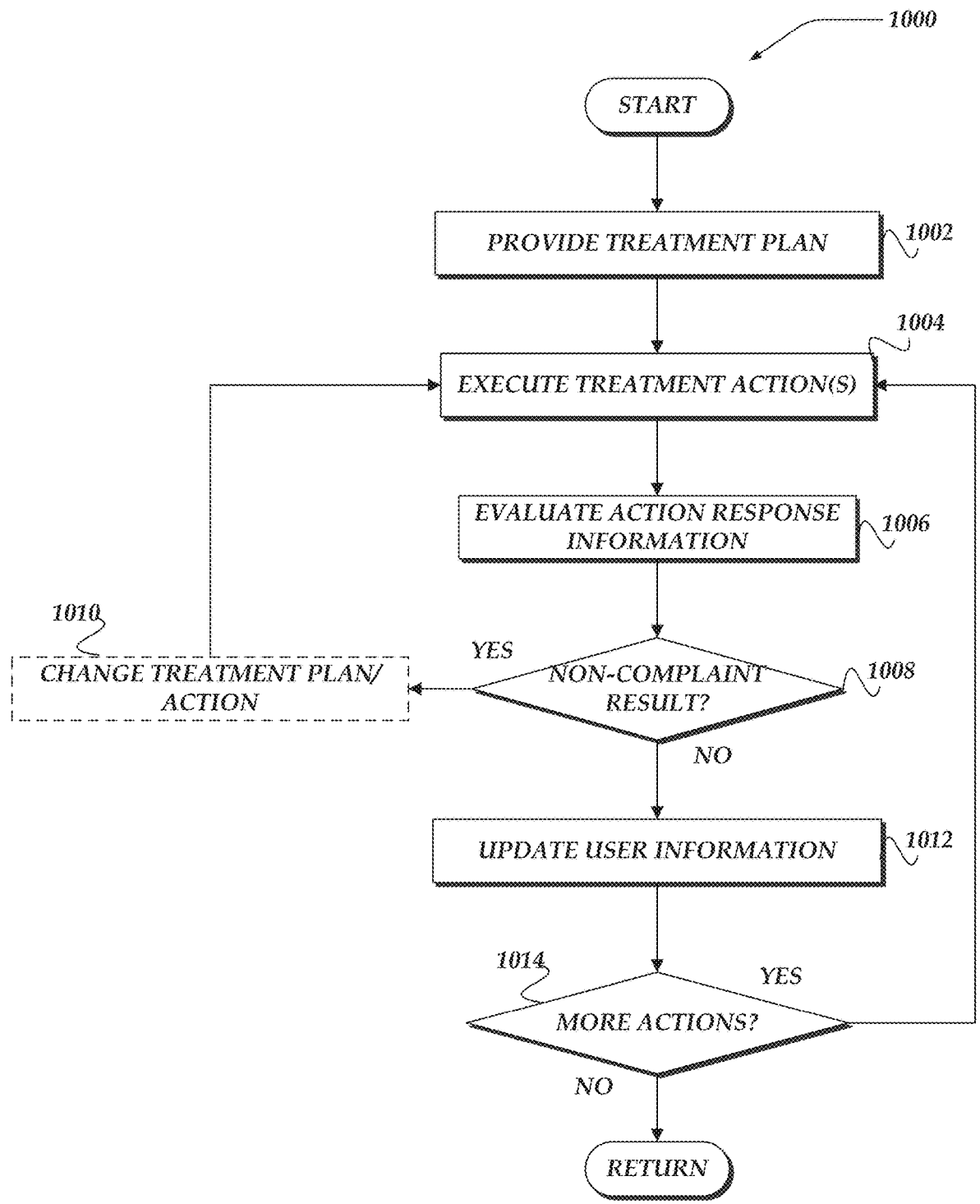
FIG. 10 illustrates a flowchart of a process for dynamic user management platform in accordance with one or more of the various embodiments.

FIG. 10 illustrates a flowchart of process 1000 for dynamic user management platform in accordance with one or more of the various embodiments. After a start block, at block 1002, in one or more of the various embodiments, a playbook engine may be arranged to provide a treatment plan that may be associated with one or more at-risk users. As described above, a playbook may be associated with a user based on a user model associated with the playbook. Accordingly, in some embodiments, a treatment plan associated with the playbook associated with the user may be provided.

In one or more of the various embodiments, playbook engines may be arranged to maintain an ordered list of treatment plans. Accordingly, in one or more of the various embodiments, the initial treatment plan may be the first treatment plan in the ordered list. However, in some embodiments, the initial treatment plan may be determined based on one or more rules, or the like, that may be encapsulated in playbook user models or treatment plan user models. In one or more of the various embodiments, a playbook may be arranged to employ different treatment plan sequencing depending on how a user may be classified by the user model that may be associated with the treatment plan or playbook. For example, in some embodiments, a playbook may be arranged to select different initial treatment plans based on the amount fees owed by a user, the number of days behind in payments, the user role, or the like.

For example, in one or more of the various embodiments, treatment plans may be associated with user models. Accordingly, in some embodiments, user management systems may be arranged to select one treatment plan from a plurality of treatment plans based on a match score provided by user models associated with each treatment plan. Thus, in some embodiments, the treatment plan associated with a user model that provides the highest match score may be selected.

At block 1004, in one or more of the various embodiments, the treatment engine may be arranged to execute the one or more treatment actions associated with the treatment plan. As described above, treatment actions may include the rules, computer readable instructions, or the like, that are directed to causing the at-risk user to provide response information.

In one or more of the various embodiments, treatment plans may be arranged to include one, few, or several treatment actions. In some embodiments, the definitions or implementation of one or more treatment actions may include integrating with one or more other internal or external services via APIs, or the like. For example, in some embodiments, a treatment action may include providing push notifications to a mobile application. Accordingly, in this example, the user management system may be arranged to integrate with the appropriate mobile carrier/mobile operating system APIs to produce the requested notifications. Likewise, in some embodiments, treatment actions that send message content over email may be integrated with one or more email services, or the like, to deliver the message content to the at-risk user.

At block 1006, in one or more of the various embodiments, the treatment engine may be arranged to evaluate the results associated with the executed treatment action. In one or more of the various embodiments, treatment actions may be arranged such that the at-risk user may be expected to actively or passively provide response information that may be associated with a given treatment action.

At decision block 1008, in one or more of the various embodiments, if a non-compliant result was generated, control may flow to block 1010; otherwise, control may flow to decision block 1012.

At block 1010, in one or more of the various embodiments, optionally, the playbook engine or the treatment engine may be arranged to determine another playbook or treatment plan based on the current results. Accordingly, control may flow back to block 1004. As described herein, evaluation points enable the treatment engine to dynamically adapt to behavior, actions, or responses of users. Accordingly, in some embodiments, treatment engines may be enabled to change to a different treatment plan, treatment action, or the like. Also, in some embodiments, treatment engines may be enabled to modify a current treatment plan or treatment action. In some embodiments, as described herein, the specific modifications or changes may be determined based on the treatment model or result model that is being evaluated. For example, in some embodiments, treatment engines may be arranged to adjust time windows used to send notification or communications to users, including limiting or reducing communication with users on certain days (such as holidays) or times (e.g., dinner time) based on needs or regulations of individual users.

At block 1012, in one or more of the various embodiments, the treatment engine may be arranged to update the user information. In one or more of the various embodiments, as responses to treatment actions may be provided, the user management server may be arranged to update the user information based on the response information.

In one or more of the various embodiments, automated natural language processing may be employed to interpret textual response information, such as, response information provided by emails, text messages, chat interactions, voice-to-text information, or the like.

In one or more of the various embodiments, the user information that may be updated may depend on the associated treatment actions or the actual response. For example, if the treatment action requests confirmation that a user will comply with one or more terms of the association with the service provider, the user information may be updated to reflect that the commitment was made.

Likewise, for example, in one or more of the various embodiments, if the user provides a document or other assets requested by a treatment action, the user information may be updated to reflect the requested documents or assets have been provided.

At decision block 1014, in one or more of the various embodiments, if there may be more treatment actions to execute, control may loop back to block 1004; otherwise, control may be returned to a calling process.

As described above, treatment plans may be associated with one or more treatment actions. Accordingly, in some embodiments, the current treatment plan may remain pending until each of its treatment actions have been performed. However, in some embodiments, a pending treatment plan may be canceled or interrupted at any evaluation point where it is determined the pending treatment plan is provided non-compliant results as indicated by a one or more result models associated with the treatment plan or its playbook.

Figure 11:
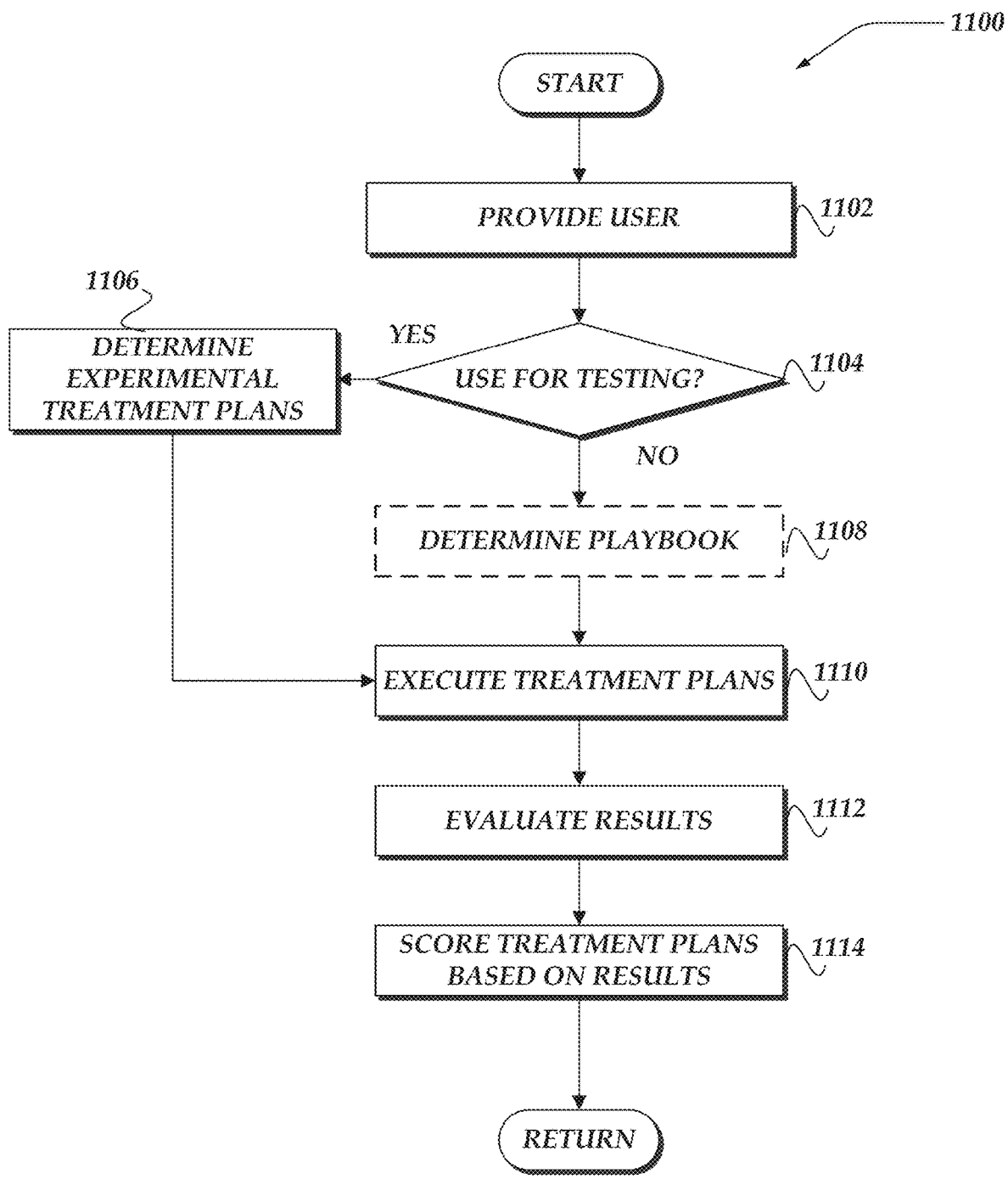
FIG. 11 illustrates a flowchart of a process for continuous testing/training for dynamic user management platform in accordance with one or more of the various embodiments.

FIG. 11 illustrates a flowchart of process 1100 for continuous testing/training for dynamic user management platform in accordance with one or more of the various embodiments. After a start block, at block 1102, in one or more of the various embodiments, one or more at-risk users may be provided to playbook engine, or the like. As described above, users may be determined to at-risk based on one or more metrics that may indicate the user may be not complying, or at-risk of not complying, with one or more terms of its association with a service provider.

At decision block 1104, in one or more of the various embodiments, if the user management system determines that the provided user may be used for experimental testing, control may flow to block 1106; otherwise, control flow to block 1108.

In some embodiments, user management systems may be arranged to randomly select one or more users for testing experimental playbooks, treatment plans, treatment actions, or the like. For example, in some embodiments, user management systems may be arranged to employ one or more defined threshold values or probability values the may be used to determine if a user may be associated with an experimental playbook, treatment plan, treatment action, or the like. In some embodiments, different types of users may be associated with different or separate rules, probabilities, or conditions to determine if experimental playbooks, treatment plans, or treatment actions should be used. Accordingly, in some embodiments, user management systems may be arranged to determine some or all users for experiments based on rules, conditions, threshold values, or the like, provided via configuration information to account for local circumstances or local requirements.

For brevity and clarity, the remainder of the description of process 1100 will be described in terms of treatment plans. However, one of ordinary skill in the art will appreciate that process 1100 may be similarly applied to playbooks, treatment plans, or treatment actions and is not limited to just treatment plans.

At block 1106, in one or more of the various embodiments, the playbook engine may be arranged to determine one or more experimental treatment plans for the one or at-risk users. In some embodiments, user management systems may be arranged to maintain a separate pool or collection of experiment treatment plans. Accordingly, in some embodiments, treatment plans from the pool of experimental treatment plans may be selected for the user.

In some embodiments, experimental treatment plans may be selected randomly. In some embodiments, the random selection of experimental treatment plans may be simple random selection from among evenly weighted treatment plans tagged or determined to be experimental. Also, in some embodiments, the selection of experimental treatment plans may include one or more of weighted distributions, round-robin based distribution, the application of one or more rules or conditions, based on user type or user classification, or the like. In some embodiments, user models may be employed to classify users, such that the classification of the user may be employed in whole or in part to determine one or more experimental treatment plans.

Accordingly, in one or more of the various embodiments, the user management system may be arranged to employ rules, model information (e.g., hyper-parameters, or the like), conditions, or the like, provided via configuration information to account for local circumstances or requirements.

At block 1108, in one or more of the various embodiments, optionally, the playbook engine may be arranged to determine a playbook for the one or more users. As described above, playbooks may be associated with at-risk users.

Note, this block is marked as optional, because in some cases, the user may have been already assigned a playbook that may be pending.

At block 1110, in one or more of the various embodiments, the user management system may be arranged to execute the one or more treatment plans. As described above, user management systems may be arranged to execute treatment plans by executing the various treatment actions associated with a treatment plan.

In one or more of the various embodiments, one or more of the treatment plans being executed may include one or more experimental treatment plans.

At block 1112, in one or more of the various embodiments, the user management system may be arranged to evaluate the results associated with the executed treatment plans. In one or more of the various embodiments, evaluation points may be established before or after a treatment plan is executed. Likewise, in one or more of the various embodiments, evaluation points may be established before or after one or more treatment actions are executed. Also, in some embodiments, evaluation points may be established response information may be provided by a user in response to the execution of a treatment action.

Accordingly, at each evaluation point, the user management system may evaluate if the at-risk user may be progressing as hoped or expected in view of the execution of the treatment plans. In some embodiments, treatment plans may be arranged to be associated with result models that may be employed to determine if the user may be progressing as hoped or expected.

In some embodiments, evaluation may include employed current user information (as updated by the execution of treatment actions) as well as response information provided by the user in response to one or more treatment actions.

Accordingly, in one or more of the various embodiments, result models associated with a given treatment plan may be customized or otherwise tailored to the given treatment plan. Thus, in one or more of the various embodiments, treatment plans may include or reference one or more result models that may be employed to evaluate the efficacy of the pending treatment plans.

In some embodiments, treatment plans may be arranged to compile response information associated with two or more treatment actions into metrics or parameter values that may be provided to a result model to evaluate if the treatment plan may be having the desired effect on the association between the user and the service provider.

At block 1114, in one or more of the various embodiments, the user management system may be arranged to score one or more of the various models associated with the executed actions based on the results. In one or more of the various embodiments, treatment plans may be scored based on how well the actual results match associated result models. For example, in some embodiments, a result model may define one or more target metrics for an at-risk. Accordingly, for example, if the execution of a treatment plan causes the relevant metrics for at-risk user to approach the values defined in an associated result model, the user management system may determine that the treatment plan may be effective.

For example, in some embodiments, user management system may be arranged to compute a statistical distance from the goals defined in a result model and the actual result produced by a treatment plan playbook. Likewise, in some cases, result models may be machine learning generated classifiers that may provide a match score that represents how close the input parameters (e.g., user information, response information, or the like) match the model.

In some embodiments, treatment plans may be associated with a normalized or quantitized score value that may enable user management system to rank treatment plans against each other. Thus, in some embodiments, experimental treatment plans that score well may be automatically promoted to general application. Likewise, in some embodiments, treatment plans that score poorly may be automatically demoted from general application.

Next, in one or more of the various embodiments, control may be returned to a calling process.

Figure 12:
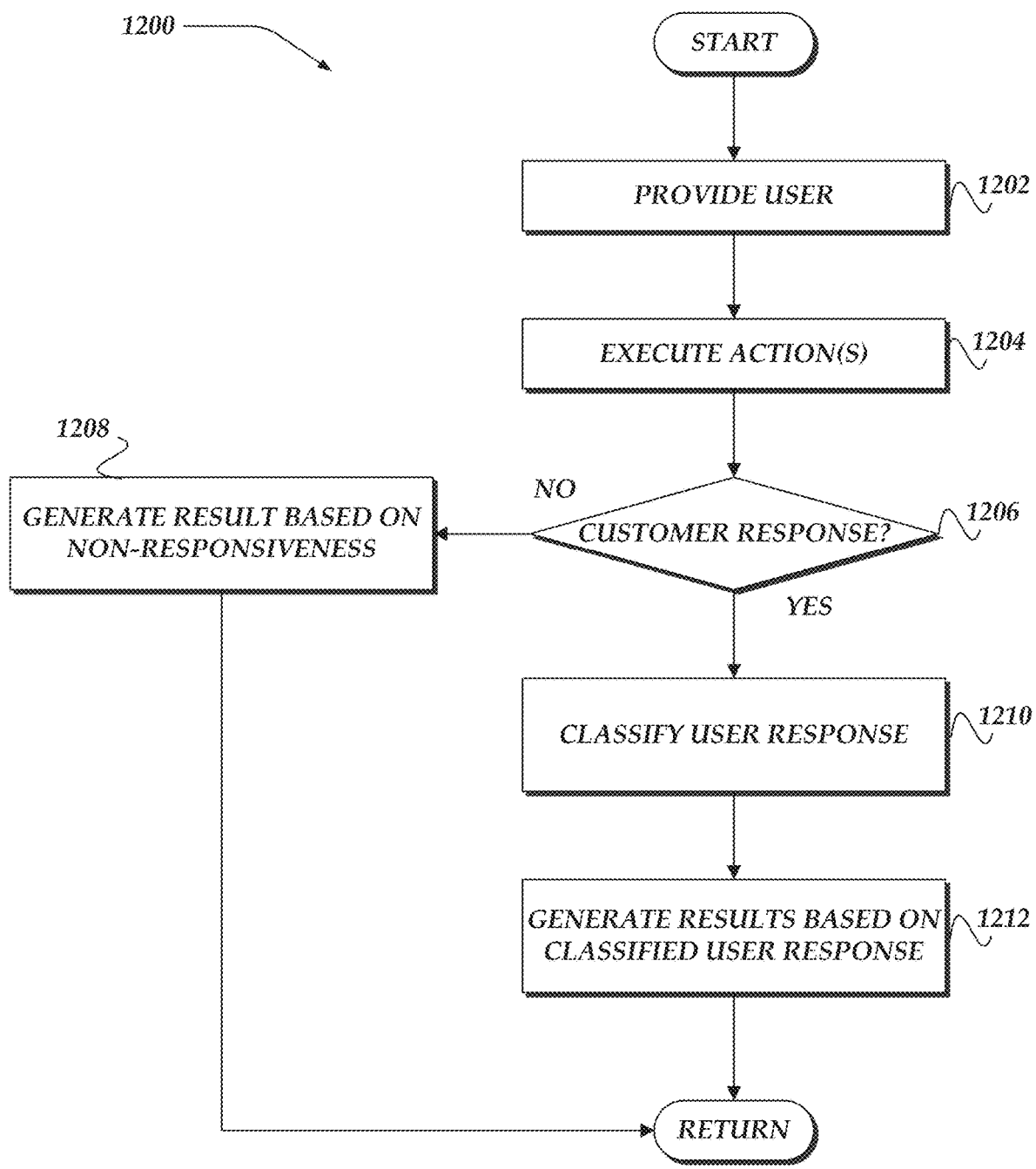
FIG. 12 illustrates a flowchart of a process for interpreting user responses for dynamic user management platform in accordance with one or more of the various embodiments.

FIG. 12 illustrates a flowchart of process 1200 for interpreting user responses for dynamic user management platform in accordance with one or more of the various embodiments. After a start block, at block 1202, in one or more of the various embodiments, one or more at-risk users may be provided. As described above, in some embodiments, a monitoring engine may be arranged to determine one or more at-risk users based on user information, or the like.

At block 1204, in one or more of the various embodiments, one or more treatment actions associated with the one or more users may be executed. In one or more of the various embodiments, treatment actions may be single or multi-step actions. In some embodiments, treatment actions may include text-based message content that may be automatically generated based on templates, user information, past user responses, or the like.

Generally, in some embodiments, a treatment plan may include one or more treatment actions related to or directed to contribute to the rehabilitation an at-risk user. For example, if a user non-compliant because they are providing required information (e.g., address information, payment method, or the like), the treatment action may be a text message reminding the user that they should provide the information.

In some embodiments, two or more treatment actions may be related or dependent on each other, for example, a first treatment action may send a message while a second message may be arranged to send a different message if the user may be unresponsive to the first message.

At decision block 1206, in one or more of the various embodiments, if there may be a user response to the one or more executed actions, control may flow block 1210; otherwise, control may flow to block 1208. In one or more of the various embodiments, treatment actions may be arranged to expect responses from users. In some embodiments, for some treatment actions the response may be a direct response, such as, as an email or text message sent by the user in response to treatment action. In other cases, response may be indirect such that a user performs a requested action that does not require directly responding to the treatment action. For example, in one or more of the various embodiments, if the treatment action is an email reminding an at-risk user to pay a fee or submit some required information, a direct response may not be expected. Accordingly, in this example, the user management system may be arranged to check the user information data store to determine if the expected response was made by the at-risk. Thus, in this example, after a treatment action that sent a reminder has been executed, a next action may be to check the user information to determine if the requested action has been performed.

In one or more of the various embodiments, one or more treatment actions may be associated timer or alarms that correspond to deadlines associated with a treatment action. Accordingly, in one or more of the various embodiments, at the expiration of a timer, or the like, the user management system may be arranged to determine (e.g., checking other sources, such as, user information) to determine if a user has complied or otherwise responded to a prior treatment action.

At block 1208, in one or more of the various embodiments, a playbook engine or treatment engine may be arranged to generate one or more results based on the non-response of the one or more users. Next, control may be returned to a calling process. In some embodiments, failing or refusing to respond to one or more treatment action is response information that may be considered by the user management system. In one or more of the various embodiments, non-responsiveness may be considered a response that triggers a treatment plan to try another type of treatment action. For example, in some embodiments, if a treatment action sent auto-generated message content using a user via a text message and the user fails to respond, the treatment plan may be arranged to execute another treatment action that automatically generates and sends message content via email to the same user.

At block 1210, in one or more of the various embodiments, the playbook engine or treatment engine may be arranged to classify the user responses. In some embodiments, user responses may be provided using natural language using text, or voice-to-text. Accordingly, in some embodiments, user management systems may be arranged to employ one or more natural language processing (NLP) models to parse values, sentiment, or semantics from the provided response information.

In one or more of the various embodiments, NLP may be combined with one or more heuristics to provide additional context based on other response information or user information to interpret the meaning of the response.

In one or more of the various embodiments, user management systems may be arranged to continuously or periodically evaluate the effectiveness of NLP models, or the like, used to interpret user response information. Accordingly, in one or more of the various embodiments, NLP models that are associated with treatment plans that provide effective results (based on comparing actual results to their associated result models) may be score higher than NLP models that are associated with less effective treatment plans.

At block 1212, in one or more of the various embodiments, the playbook engine or treatment engine may be arranged to generate results based on one or more of the classified user responses. In one or more of the various embodiments, results may be based a combination of response information, interpreted response information, user information, or the like. In some embodiments, result models associated with treatment plans or playbooks may be arranged to interpret results associated with treatment actions.

In one or more of the various embodiments, response information may be considered different or separate from results, because in some embodiments, response information may be processed to provide result information. In some embodiments, different kinds of actions or responses (text based, application based, or the like) may be produce the same results. For example, if the result of interest is reducing the number of unexcused absences for a student, this result if attained may be via a number of treatment actions. Likewise, for example, this result may be communicated to the user management system via a number of different kind of responses, such as, email response, text response, or actually attending class such that absences are reduced.

Accordingly, different treatment plans or treatment actions may be evaluated based on comparable result information rather than just response information. Thus, in some embodiments, user management system may be arranged to match treatment plans with at-risk users based on results achieved for similar users (as determined by user model matching).

Next, in one or more of the various embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing user associations with a service provider, wherein one or more processors execute instructions to perform actions, comprising:
instantiating a dynamic user management platform;
executing, by the dynamic user management platform, a plurality of actions, including:
providing a status value for an association between a user and the service provider when the user is non-compliant with one or more terms of the association;
classifying the user with one or more user models that are continuously trained with the status value and user information;
employing the one or more user models to continuously retrain on or more machine learning classifiers to generate one or more result models that use the one or more machine learning classifiers to determine one or more treatment plans from one or more playbooks for the user from a plurality of treatment plans based on one or more of the classification of the user or expected results, wherein the one or more treatment plans are associated with one or more evaluation points, and wherein the one or more results models combine the one or more machine learning classifiers and heuristics to evaluate matching of the one or more result models to one or more results produced by execution of the one or more treatment plans by the service provider;
generating response information associated with the user based on execution of the one or more treatment plans, wherein the user information is updated based on the response information;
during execution of the one or more treatment plans at each evaluation point, continuously retraining the one or more result models' classifiers to classify one or more of the response information and the updated user information, wherein one or more evaluation actions are registered by the service provider and defined by configuration information, a local circumstance and an interest of the service provider;
determining one or more fragments of the classified response information that are also correlated with one or more user intentions or one or more compliance goals;
determining one or more treatment actions based on the one or more correlated user intentions or the one or more compliance goals; and
automatically identifying non-compliance of the user with one or more conditions of a current treatment plan, and in response to the non-compliance performing further actions, including:
modifying the current treatment plan based on the one or more result models;
determining one or more other treatment plans based on the classified updated user information; and
executing one or more of the one or more other treatment plans or the modified treatment plan to generate other response information associated with the user, wherein the user information associated with the user is further updated based on the other response information; and
updating the status value to indicate one or more of an improvement or further reduction in compliance with the terms of the association based on completion or non-completion of at least one of the modified treatment plan or the one or more other treatment plans; and
employing a global positioning systems (GPS) device to monitor geo-location information that is employed to modify a display to the user of the status value, treatment plan, and user information, wherein the geolocation information is employed to select a time zone, spoken language, financial currency, financial currency format, local circumstance and calendar format for inclusion in a document, user interface, and a report that is used to display the status value, treatment plan, and user information.

2. The method of claim 1, wherein determining the one or more treatment plans further comprises:
randomly selecting one or more experimental treatment plans that are separate from the plurality of treatment plans;
substituting the one or more treatment plans with the one or more experimental treatment plans;
comparing compliance by the user associated with the one or more experimental treatment plans to compliance by one or more other users associated with the plurality of treatment plans; and
including the one or more experimental treatment plans in the plurality of treatment plans when the user complies with the one or more experimental treatment plans.

3. The method of claim 1, further comprising:
providing one or more playbooks associated with the one or more treatment plans, wherein each playbook is associated with one or more playbook user models;
employing the one or more playbook user models associated with the one or more playbooks to classify the user based on the user information;
associating a playbook with the user based on the classification that is based on the one or more playbook user models associated with the one or more playbooks; and
determining the one or more treatment plans based on the associated playbook.

4. The method of claim 1, wherein executing the one or more treatment plans, further comprises:
determining one or more requested actions for the one or more treatment plans that are completed by the user;
classifying and interpreting textual response information communicated by the user;
employing the classified and interpreted response information and the one or more user completed actions for the one or more treatment plans to generate message content; and
providing the message content to the user, wherein the message content is provided using one or more of text messages, mobile applications, email, web pages, automated voice calls, or interactive chat bots.

5. The method of claim 1, further comprising:
monitoring the user information to determine one or more metrics for a plurality of users of a service provider; and
determining one or more users of the plurality of users that are non-compliant with the one or more terms of the association with the service provider based on the one or more metrics exceeding a threshold value.

6. The method of claim 1, further comprising:
modifying the one or more treatment plans based on the response information, wherein the modifications include one or more of extending deadlines, shortening deadlines, increasing a rate of performing one or more treatment actions, modifying the one or more evaluation points, jumping to another treatment plan, terminating a treatment plan, or restarting a treatment plan.

7. A system for managing user associations with a service provider, comprising:
a memory for storing instructions; and
one or more processors that execute the instructions to enable performance of actions, including:
instantiating a dynamic user management platform that enables performance of a plurality of actions, including:
providing a status value for an association between a user and the service provider when the user is non-compliant with one or more terms of the association;
classifying the user with one or more user models that are continuously trained with the status value and user information;
employing the one or more user models to continuously retrain on or more machine learning classifiers to generate one or more result models that use the one or more machine learning classifiers to determine one or more treatment plans from one or more playbooks for the user from a plurality of treatment plans based on one or more of the classification of the user or expected results, wherein the one or more treatment plans are associated with one or more evaluation points, and wherein the one or more results models combine the one or more machine learning classifiers and heuristics to evaluate matching of the one or more result models to one or more results produced by execution of the one or more treatment plans by the service provider;
generating response information associated with the user based on execution of the one or more treatment plans, wherein the user information is updated based on the response information;
during execution of the one or more treatment plans at each evaluation point, continuously training the one or more result models' classifiers to classify one or more of the response information and the updated user information, wherein one or more evaluation actions are registered by the service provider and defined by configuration information, a local circumstance and an interest of the service provider;
determining one or more fragments of the classified response information that are also correlated with one or more user intentions or one or more compliance goals;
determining one or more treatment actions based on the one or more correlated user intentions or the one or more compliance goals; and
automatically identifying non-compliance of the user with one or more conditions of a current treatment plan, and in response to the non-compliance performing further actions, including:
modifying the current treatment plan based on the one or more result models;
determining one or more other treatment plans based on the classified updated user information; and
executing one or more of the one or more other treatment plans or the modified treatment plan to generate other response information associated with the user, wherein the user information associated with the user is further updated based on the other response information; and
updating the status value to indicate one or more of an improvement or further reduction in compliance with the terms of the association based on completion or non-completion of at least one of the modified treatment plan or the one or more other treatment plans; and
employing a global positioning systems (GPS) device to monitor geo-location information that is employed to modify a display to the user of the status value, treatment plan, and user information, wherein the geolocation information is employed to select a time zone, spoken language, financial currency, financial currency format, local circumstance and calendar format for inclusion in a document, user interface, and a report that is used to display the status value, treatment plan, and user information.

8. The system of claim 7, wherein determining the one or more treatment plans further comprises:
randomly selecting one or more experimental treatment plans that are separate from the plurality of treatment plans;
substituting the one or more treatment plans with the one or more experimental treatment plans;
comparing compliance by the user associated with the one or more experimental treatment plans to compliance by one or more other users associated with the plurality of treatment plans; and
including the one or more experimental treatment plans in the plurality of treatment plans when the user complies with the one or more experimental treatment plans.

9. The system of claim 7, further comprising:
providing one or more playbooks associated with the one or more treatment plans, wherein each playbook is associated with one or more playbook user models;
employing the one or more playbook user models associated with the one or more playbooks to classify the user based on the user information;
associating a playbook with the user based on the classification that is based on the one or more playbook user models associated with the one or more playbooks; and
determining the one or more treatment plans based on the associated playbook.

10. The system of claim 7, wherein executing the one or more treatment plans, further comprises:
determining one or more requested actions for the one or more treatment plans that are completed by the user;
classifying and interpreting textual response information communicated by the user;
employing the classified and interpreted response information and the one or more user completed actions for the one or more treatment plans to generate message content; and
providing the message content to the user, wherein the message content is provided using one or more of text messages, mobile applications, email, web pages, automated voice calls, or interactive chat bots.

11. The system of claim 7, further comprising:
monitoring the user information to determine one or more metrics for a plurality of users of a service provider; and
determining one or more users of the plurality of users that are non-compliant with the one or more terms of the association with the service provider based on the one or more metrics exceeding a threshold value.

12. The system of claim 7, further comprising:
modifying the one or more treatment plans based on the response information, wherein the modifications include one or more of extending deadlines, shortening deadlines, increasing a rate of performing one or more treatment actions, modifying the one or more evaluation points, jumping to another treatment plan, terminating a treatment plan, or restarting a treatment plan.

13. A processor-readable non-transitory storage media that includes instructions for managing user associations with a service provider, wherein execution of the instructions by one or more processors enables performance of actions, comprising:

instantiating a dynamic user management platform;

executing, by the dynamic user management platform, a plurality of actions, including:

providing a status value for an association between a user and the service provider when the user is non-compliant with one or more terms of the association;

classifying the user with one or more user models that are continuously trained with the status value and user information;

employing the one or more user models to continuously retrain on or more machine learning classifiers to generate one or more result models that use the one or more machine learning classifiers to determine one or more treatment plans from one or more playbooks for the user from a plurality of treatment plans based on one or more of the classification of the user or expected results, wherein the one or more treatment plans are associated with one or more evaluation points, and wherein the one or more results models combine the one or more machine learning classifiers and heuristics to evaluate matching of the one or more result models to one or more results produced by execution of the one or more treatment plans by the service provider;

generating response information associated with the user based on execution of the one or more treatment plans, wherein the user information is updated based on the response information;

during execution of the one or more treatment plans at each evaluation point, continuously training the one or more result models' classifiers to classify one or more of the response information and the updated user information, wherein one or more evaluation actions are registered by the service provider and defined by configuration information, a local circumstance and an interest of the service provider;

determining one or more fragments of the classified response information that are also correlated with one or more user intentions or one or more compliance goals;

determining one or more treatment actions based on the one or more correlated user intentions or the one or more compliance goals; and automatically identifying non-compliance of the user with one or more conditions of a current treatment plan, and in response to the non-compliance performing further actions, including:

modifying the current treatment plan based on the one or more result models;

determining one or more other treatment plans based on the classified updated user information; and executing one or more of the one or more other treatment plans or the modified treatment plan to generate other response information associated with the user, wherein the user information associated with the user is further updated based on the other response information; and updating the status value to indicate one or more of an improvement or further reduction in compliance with the terms of the association based on completion or non-completion of at least one of the modified treatment plan or the one or more other treatment plans; and employing a global positioning systems (GPS) device to monitor geo-location information that is employed to modify a display to the user of the status value, treatment plan, and user information, wherein the geolocation information is employed to select a time zone, spoken language, financial currency, financial currency format, local circumstance and calendar format for inclusion in a document, user interface, and a report that is used to display the status value, treatment plan, and user information.

14. The media of claim 13, wherein determining the one or more treatment plans further comprises:

randomly selecting one or more experimental treatment plans that are separate from the plurality of treatment plans;

substituting the one or more treatment plans with the one or more experimental treatment plans;

comparing compliance by the user associated with the one or more experimental treatment plans to compliance by one or more other users associated with the plurality of treatment plans; and including the one or more experimental treatment plans in the plurality of treatment plans when the user complies with the one or more experimental treatment plans.

15. The media of claim 13, further comprising:

providing one or more playbooks associated with the one or more treatment plans, wherein each playbook is associated with one or more playbook user models;

employing the one or more playbook user models associated with the one or more playbooks to classify the user based on the user information;

associating a playbook with the user based on the classification that is based on the one or more playbook user models associated with the one or more playbooks; and determining the one or more treatment plans based on the associated playbook.

16. The media of claim 13, wherein executing the one or more treatment plans, further comprises:

determining one or more requested actions for the one or more treatment plans that are completed by the user;

classifying and interpreting textual response information communicated by the user;

employing the classified and interpreted response information and the one or more user completed actions for the one or more treatment plans to generate message content; and providing the message content to the user, wherein the message content is provided using one or more of text messages, mobile applications, email, web pages, automated voice calls, or interactive chat bots.

17. The media of claim 13, further comprising:

monitoring the user information to determine one or more metrics for a plurality of users of a service provider; and determining one or more users of the plurality of users that are non-compliant with the one or more terms of the association with the service provider based on the one or more metrics exceeding a threshold value.

18. The media of claim 13, further comprising:

modifying the one or more treatment plans based on the response information, wherein the modifications include one or more of extending deadlines, shortening deadlines, increasing a rate of performing one or more treatment actions, modifying the one or more evaluation points, jumping to another treatment plan, terminating a treatment plan, or restarting a treatment plan.

19. A network computer for managing user associations with a service provider over a network between two or more computers, comprising:
a memory that stores at least instructions; and
one or more processors that execute instructions that enable performance of actions, including:
instantiating a dynamic user management platform that enables performance of a plurality of actions, including:
providing a status value for an association between a user and the service provider when the user is non-compliant with one or more terms of the association;
classifying the user with one or more user models that are continuously trained with the status value and user information;
employing the one or more user models to continuously retrain on or more machine learning classifiers to generate one or more result models that use the one or more machine learning classifiers to determine one or more treatment plans from one or more playbooks for the user from a plurality of treatment plans based on one or more of the classification of the user or expected results, wherein the one or more treatment plans are associated with one or more evaluation points, and wherein the one or more results models combine the one or more machine learning classifiers and heuristics to evaluate matching of the one or more result models to one or more results produced by execution of the one or more treatment plans by the service provider;
generating response information associated with the user based on execution of the one or more treatment plans, wherein the user information is updated based on the response information;
during execution of the one or more treatment plans at each evaluation point, continuously training the one or more result models' classifiers to classify one or more of the response information and the updated user information, wherein one or more evaluation actions are registered by the service provider and defined by configuration information, a local circumstance and an interest of the service provide;
determining one or more fragments of the classified response information that are also correlated with one or more user intentions or one or more compliance goals;
determining one or more treatment actions based on the one or more correlated user intentions or the one or more compliance goals; and
automatically identifying non-compliance of the user with one or more conditions of a current treatment plan, and in response to the non-compliance performing further actions, including:
modifying the current treatment plan based on the one or more result models;
determining one or more other treatment plans based on the classified updated user information; and
executing one or more of the one or more other treatment plans or the modified treatment plan to generate other response information associated with the user, wherein the user information associated with the user is further updated based on the other response information; and
updating the status value to indicate one or more of an improvement or further reduction in compliance with the terms of the association based on completion or non-completion of at least one of the modified treatment plan or the one or more other treatment plans; and
employing a global positioning systems (GPS) device to monitor geo-location information that is employed to modify a display to the user of the status value, treatment plan, and user information, wherein the geolocation information is employed to select a time zone, spoken language, financial currency, financial currency format, local circumstance and calendar format for inclusion in a document, user interface, and a report that is used to display the status value, treatment plan, and user information.

20. The network computer of claim 19, wherein determining the one or more treatment plans further comprises:
randomly selecting one or more experimental treatment plans that are separate from the plurality of treatment plans;
substituting the one or more treatment plans with the one or more experimental treatment plans;
comparing compliance by the user associated with the one or more experimental treatment plans to compliance by one or more other users associated with the plurality of treatment plans; and
including the one or more experimental treatment plans in the plurality of treatment plans when the user complies with the one or more experimental treatment plans.

21. The network computer of claim 19, further comprising:
providing one or more playbooks associated with the one or more treatment plans, wherein each playbook is associated with one or more playbook user models;
employing the one or more playbook user models associated with the one or more playbooks to classify the user based on the user information;
associating a playbook with the user based on the classification that is based on the one or more playbook user models associated with the one or more playbooks; and
determining the one or more treatment plans based on the associated playbook.

22. The network computer of claim 19, wherein executing the one or more treatment plans, further comprises:
determining one or more requested actions for the one or more treatment plans that are completed by the user;
classifying and interpreting textual response information communicated by the user;
employing the classified and interpreted response information and the one or more user completed actions for the one or more treatment plans to generate message content; and
providing the message content to the user, wherein the message content is provided using one or more of text messages, mobile applications, email, web pages, automated voice calls, or interactive chat bots.

23. The network computer of claim 19, further comprising:
- monitoring the user information to determine one or more metrics for a plurality of users of a service provider; and
- determining one or more users of the plurality of users that are non-compliant with the one or more terms of the association with the service provider based on the one or more metrics exceeding a threshold value.

24. The network computer of claim 19, further comprising:
- modifying the one or more treatment plans based on the response information, wherein the modifications include one or more of extending deadlines, shortening deadlines, increasing a rate of performing one or more treatment actions, modifying the one or more evaluation points, jumping to another treatment plan, terminating a treatment plan, or restarting a treatment plan.

* * * * *